US011719932B2

(12) United States Patent
Yoneda et al.

(10) Patent No.: US 11,719,932 B2
(45) Date of Patent: Aug. 8, 2023

(54) HEAD-UP DISPLAY

(71) Applicant: MAXELL, LTD., Kyoto (JP)

(72) Inventors: Haruhiko Yoneda, Kyoto (JP); Souta Sato, Kyoto (JP); Nozomu Shimoda, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 17/258,465

(22) PCT Filed: Jun. 17, 2019

(86) PCT No.: PCT/JP2019/023955
§ 371 (c)(1),
(2) Date: Jan. 7, 2021

(87) PCT Pub. No.: WO2020/012879
PCT Pub. Date: Jan. 16, 2020

(65) Prior Publication Data
US 2021/0271079 A1 Sep. 2, 2021

(30) Foreign Application Priority Data
Jul. 13, 2018 (JP) .................................. 2018-133706

(51) Int. Cl.
*B60K 35/00* (2006.01)
*G02B 27/01* (2006.01)
(Continued)

(52) U.S. Cl.
CPC .......... *G02B 27/0101* (2013.01); *B60K 35/00* (2013.01); *B60R 1/00* (2013.01);
(Continued)

(58) Field of Classification Search
CPC .................................................... G02B 27/48
See application file for complete search history.

(56) References Cited

U.S. PATENT DOCUMENTS

2002/0021461 A1* 2/2002 Ono ........................ G02B 5/32
359/13
2009/0135374 A1* 5/2009 Horiuchi .............. H04N 9/3129
353/13
(Continued)

FOREIGN PATENT DOCUMENTS

JP 2010-156608 A 7/2010
JP 2014-234139 A 12/2014
(Continued)

OTHER PUBLICATIONS

International Search Report of PCT/JP2019/023955 dated Jul. 23, 2019.

*Primary Examiner* — Nan-Ying Yang
(74) *Attorney, Agent, or Firm* — Mattingly & Malur, PC

(57) ABSTRACT

A main controller of an HUD is configured to: acquire road surface information of a front road surface based on a plurality of measurement points on the front road surface, which is detected by a road surface detection sensor mounted on a vehicle with the HUD and is positioned forward of a traveling direction of the vehicle; calculate, by using the road surface information, a virtual image plane position on a virtual image plane where a virtual image of a display object is displayed, which is a display position of the virtual image for displaying the virtual image along the front road surface; and calculate a display position of a display surface within an image display device, which corresponds to the virtual image plane position, so as to output, to the image display device, a control signal for displaying the display object on the display position of the display surface.

13 Claims, 17 Drawing Sheets

(51) Int. Cl.
  *G06K 9/00* (2022.01)
  *B60R 1/00* (2022.01)
  *G06V 20/56* (2022.01)

(52) U.S. Cl.
  CPC ...... *G06V 20/56* (2022.01); *B60K 2370/1529* (2019.05); *B60K 2370/23* (2019.05); *B60K 2370/31* (2019.05); *B60K 2370/333* (2019.05); *B60K 2370/336* (2019.05); *B60R 2300/205* (2013.01); *G02B 2027/014* (2013.01); *G02B 2027/0138* (2013.01)

(56) References Cited

U.S. PATENT DOCUMENTS

| | | | |
|---|---|---|---|
| 2010/0164702 | A1 | 7/2010 | Sasaki et al. |
| 2010/0292886 | A1* | 11/2010 | Szczerba ............... G01S 13/723 701/31.4 |
| 2013/0242404 | A1* | 9/2013 | Kobayashi ............. G02B 27/01 359/630 |
| 2016/0121888 | A1* | 5/2016 | Choi .................... G01S 13/862 701/1 |
| 2019/0025580 | A1 | 1/2019 | Nagano et al. |
| 2019/0271840 | A1 | 9/2019 | Kishigami et al. |

FOREIGN PATENT DOCUMENTS

| | | |
|---|---|---|
| JP | 2016-118851 A | 6/2016 |
| WO | 2017/134866 A1 | 8/2017 |
| WO | 2018/043558 A1 | 3/2018 |
| WO | 2018/070252 A1 | 4/2018 |

\* cited by examiner

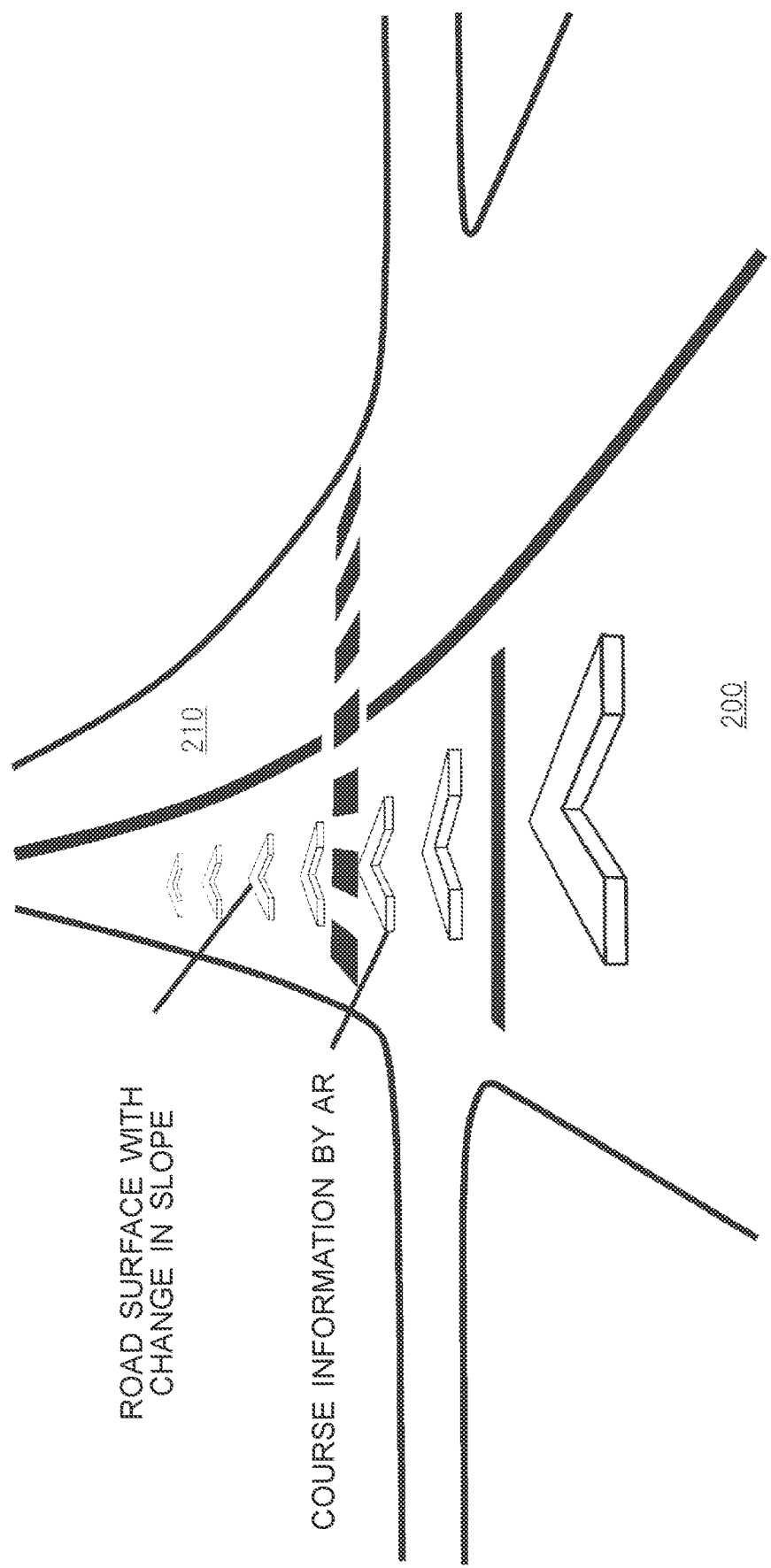

CONVERSION FROM CAMERA COORDINATES ONTO CAMERA PROJECTION PLANE

CONVERSION FROM CAMERA PROJECTION PLANE ONTO IMAGE

HEAD-UP DISPLAY

TECHNICAL FIELD

The present invention relates to a head-up display (Head-Up Display: HUD).

BACKGROUND ART

Patent Literature 1 discloses an automotive display system which "includes an image projection unit and an angle information acquisition unit. The image projection unit projects a light flux including an image with a display object toward one eye of an image viewer. The angle information acquisition unit acquires at least one of vehicle angle information and external environment angle information. The vehicle angle information relates to an angle of at least one of attitudes and a heading of a vehicle carrying the image viewer. The external environment angle information relates to an angle of a background object at a target position of the display object in a background of an external environment of the vehicle. The image projection unit changes an angle of the display object in the image based on at least one of the vehicle angle information and the external environment angle information acquired by the angle information acquisition unit" (excerpted from Abstract).

CITATION LIST

Patent Literature

Patent Literature: JP-A-2010-156608

SUMMARY OF INVENTION

Technical Problem

In sensing performed by a general monocular camera, a distance is estimated by referring to a point (vanishing point) at which parallel white lines drawn on the road appear to intersect with each other and calculating the distance based on the height (angle) from the vanishing point. Since the calculation above assumes that all in the field of view have the same height, if applying the height calculation method described above to a non-flat road surface with slope on its front, not only the distance from the vanishing point, but also the height of the road surface due to the slope is included in the calculation result. On the coordinates of the road surface with the slope, the height of the road surface due to the slope is added to the height calculated based on the vanishing point, and accordingly, an error that is not small is included in the coordinates of the road surface with the slope. In order to perform AR display in accordance with the shape of the front road surface, the three-dimensional coordinates of the road surface are necessary. However, in the case of using the monocular camera solely, only the flat road surface allows accurate calculation. Therefore, there remains a problem that the AR display along the slope of the road surface cannot be performed.

The present invention has been made in view of the circumstance described above, and an object of the present invention is to provide an HUD capable of performing AR display for a road surface with slope more suitably.

Solution to Problem

In order to solve the problem above, the present invention includes the technical features described in the scope of claims. As one aspect of the present invention, it is provided a head-up display for irradiating an image light including a display object toward a projection target member so as to display the display object as a virtual image, the head-up display comprising: an image display device including a light source and a display surface, the image display device being configured to output the image light generated by a light which has been emitted from the light source and transmitted through the display object displayed on the display surface; a virtual image optical system configured to enlarge and project the image light; and a main controller connected to the image display device, wherein the main controller is configured to: acquire road surface information of a front road surface based on a plurality of measurement points on the front road surface, the plurality of measurement points being detected by a road surface detection sensor mounted on a vehicle with the head-up display and being positioned forward of a traveling direction of the vehicle; calculate, by using the road surface information, a virtual image plane position on a virtual image plane where the virtual image of the display object is displayed, the virtual image plane position being a display position of the virtual image for displaying the virtual image along the front road surface; and calculate a display position of the display surface corresponding to the virtual image plane position so as to output, to the image display device, a control signal for displaying the display object on the display position of the display surface.

Advantageous Effects of Invention

According to the present invention, it is possible to provide an HUD capable of performing AR display for a road surface with slope more suitably. The problems, configurations, and effects other than those described above will be clarified by explanation of the embodiments below.

BRIEF DESCRIPTION OF DRAWINGS

FIG. 11 illustrates an example in which AR display is performed for a front road surface having change in slope, with considering the slope.

DESCRIPTION OF EMBODIMENTS

Hereinafter, embodiments of the present invention will be described in detail with reference to the drawings. Throughout the drawings for explaining the embodiments, the same members are provided with the same reference signs in general, and repetitive explanation thereof will be omitted. In each of the embodiments described below, an example in which a head-up display (HUD) is mounted in an automobile as a vehicle will be described, meanwhile, the vehicle may be a train or a working machine such as a hydraulic excavator. Furthermore, since the example of an automobile as a vehicle will be described in the present embodiment, tires thereof correspond to a traveling body. Meanwhile, in the case of a train, wheels correspond to the traveling body, and in the case of a working machine, a crawler corresponds thereto.

First Embodiment

Figure 1:
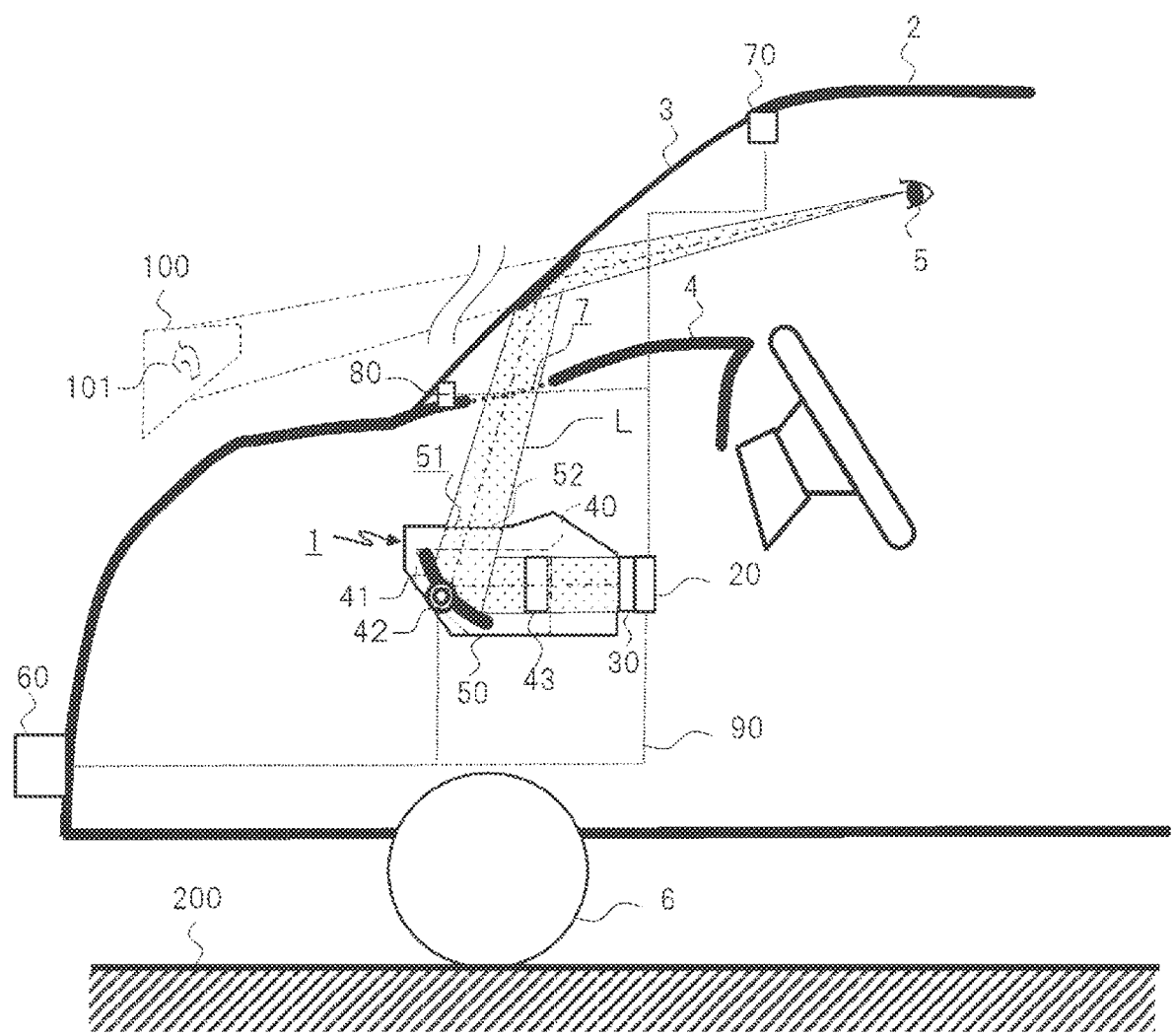
FIG. 1 is a schematic configuration diagram of an HUD.
Figure 2:
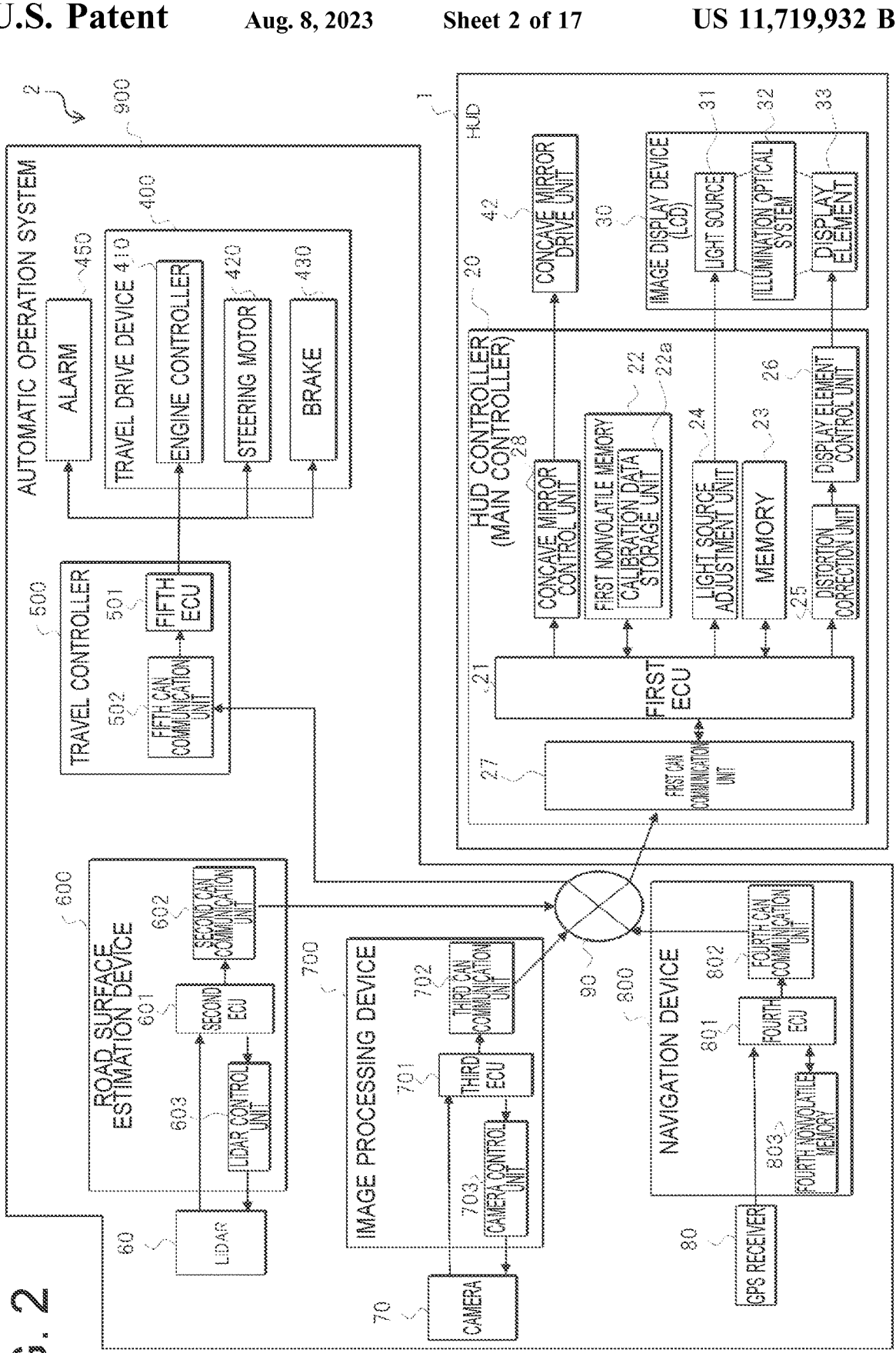
FIG. 2 is a system configuration diagram of an HUD.

With reference to FIG. 1 and FIG. 2, a configuration of an HUD 1 according to the present embodiment will be described. FIG. 1 is a schematic configuration diagram of the HUD 1. FIG. 2 is a system configuration diagram of the HUD 1.

As illustrated in FIG. 1, the HUD 1 is provided in a dashboard 4 of a vehicle 2. The dashboard 4 includes a dashboard opening 7 which allows an image light L emitted from the HUD 1 to pass therethrough. The image light L is reflected by a wind shield 3 of the vehicle 2 and made incident on the eye of a driver 5. The driver 5 visually recognizes a virtual image 101 of an arrow display object by the image light L further forward than the wind shield 3. A projection target member is not limited to the wind shield 3, and other members such as a combiner may be used as long as it is a member onto which the image light L is projected.

The HUD 1 includes an outer housing 50, an HUD controller 20 and an image display device 30 to be mounted on the outer housing 50, and a virtual image optical system 40 for enlarging and projecting the image light L emitted from the image display device 30.

On an upper surface of the outer housing 50, a housing opening 51 serving as an exit port of the image light L is formed. The housing opening 51 is covered with an antiglare plate 52 for preventing dust and the like from entering the outer housing 50. The antiglare plate 52 is formed by a member that transmits a visible light.

The image display device 30 is configured by using an LCD (Liquid Crystal Display). More specifically, the image display device 30 includes a light source 31, an illumination optical system 32, and a display element 33 that emits the image light L including a display object (see FIG. 2). The illumination optical system 32 is disposed between the light source 31 and the display element 33, and configured to guide a light emitted from the light source 31 to the display element 33.

The virtual image optical system 40 is configured by a lens unit 43 and a concave mirror 41 which are arranged in the order of proximity of the image display device 30 along an emission direction of the image light L. Furthermore, the virtual image optical system 40 according to the present invention includes a concave mirror drive unit 42 configured to rotate the concave mirror 41. Although not illustrated in FIG. 1, a folding mirror that folds back an optical path of the image light L may be provided between the lens unit 43 and the concave mirror 41. The folding mirror is a mirror that reflects the image light L emitted from the lens unit 43 toward the concave mirror 41. When providing the folding mirror, the optical path of the image light L can be further lengthened, which makes it possible to display a virtual image plane 100 further forward. In FIG. 1, the virtual image 101 of the arrow display object which represents left turn is displayed as a display object on the virtual image plane 100.

The lens unit 43 is an assembly of at least one or more lenses for adjusting an optical distance between the concave mirror 41 and the image display device 30.

The concave mirror 41 is a member that reflects the image light L which has been transmitted through the lens unit 43 toward the housing opening 51. The concave mirror 41 is rotated by the concave mirror drive unit 42. The concave mirror drive unit 42 is configured, for example, by a mirror rotation axis and a motor that rotates the mirror rotation axis. When rotation of the motor is transmitted to the mirror rotation axis of the concave mirror 41, the concave mirror 41 is rotated, whereby the image light L is reflected toward the wind shield 3 with a reflection angle thereof being changed. When a projection direction of the image light L is changed, the reflection angle of the image light L on the wind shield 3 is changed. In this way, when the reflection angle of the image light L is changed, the height of the virtual image plane 100 (see FIG. 7) itself is changed.

The HUD 1 according to the present embodiment includes the technical feature in which a display object is displayed as a virtual image by AR (Augmented Reality) along slope of a front road surface 210 (see FIG. 4A) positioned forward in a traveling direction of the vehicle 2. Accordingly, the HUD 1 is configured to adjust the height (height in the real space, hereinafter referred to as "display object height") from a ground surface 200 of front wheels 6 and the rear wheels 6 at the time of displaying the virtual image 101 on the virtual image plane 100 (see FIG. 7). In the present embodiment, adjustment of the display object height is realized by changing a display position of the virtual image 101 on the virtual image plane 100 (hereinafter referred to as "virtual image plane position"). In this connection, when the height of the virtual image plane 100 itself is changed by changing an angle of the concave mirror 41, in the case of displaying the virtual image 101 at the same virtual image plane position on the virtual image plane 100 of which the height has been changed, the display object height is shifted by the height difference of the virtual image plane 100 itself. In the following, for convenience of explanation, it is assumed that the virtual image plane 100 itself is not changed, that is, the angle of the concave mirror 41 is not changed.

On a front surface of the vehicle 2, a LiDAR (Light Detection and Ranging) 60 as a road surface detection sensor is installed. An installation position and height of the LiDAR 60 illustrated in FIG. 1 is merely an example, and its installation position and height may be different from the illustrated example.

On an upper portion of the wind shield 3 inside the vehicle 2, a camera 70 as an obstacle detection sensor is installed, and on the dashboard 4, a GPS (global positioning system) receiver 80 as a position calculation sensor is installed. An installation position of the camera 70 illustrated in FIG. 1 is merely an example, and it may be installed outside the vehicle 2. An installation position of the GPS receiver 80 is also merely an example, and the installation position thereof is not limited on the dashboard 4.

As illustrated in FIG. 2, in the vehicle 2, an automatic operation system 900 and the HUD 1 are connected via an onboard network (CAN: Control Area Network) 90.

The automatic operation system 900 mainly includes a travel drive device 400, a travel controller 500, a road surface estimation device 600, an image processing device 700, and a navigation device 800. The travel drive device 400 includes an engine controller 410, a steering motor 420, and a brake 430. The travel controller 500 acquires road surface information, obstacle information, map information, and navigation information from the road surface estimation device 600, the image processing device 700, and the navigation device 800 via the CAN 90, respectively, and uses the information to output control signals for performing an automatic operation, such as an engine control signal, a steering angle signal, and a brake signal, to the travel drive device 400.

The HUD 1 may be configured to perform processing of calculating an estimation formula which expresses the front road surface 210 (road surface estimation processing), meanwhile, in the present embodiment, an example in which the road surface estimation device 600 serving as one of the elements constituting the automatic operation system 900 calculates the estimation formula of the plane of the front road surface 210 based on measurement point data from the LiDAR 60 so as to output the road surface information including the above to the HUD 1 will be described. Furthermore, in the present embodiment, it is assumed that each of the camera 70, the image processing device 700, the GPS receiver 80, and the navigation device 800 serves as one of the elements constituting the automatic operation system 900 and is used for processing of displaying the virtual image 101 of the display object in the HUD 1. Similarly, to the case of the road surface estimation device 600, the camera 70, the GPS receiver 80, etc. may be configured as dedicated products of the HUD 1.

In the first embodiment, the LiDAR 60 measures a distance and a position to a plurality of measurement points on the front road surface 210 (for example, measurement points $P_1$, $P_2$, $P_3$ in FIG. 4A) to generate the measurement point data, and the road surface estimation device 600 calculates the estimation formula in which the plane including the measurement point data is defined by a three-axis rectangular coordinate system in the real space. Then, the road surface estimation device 600 outputs the estimation formula to the HUD 1 as road surface information. Furthermore, the road surface estimation device 600 may be configured to calculate an angle (road surface angle $\theta_r$: see FIG. 4A) formed by the plane of the front road surface 210 with respect to the ground surface 200, and output the calculated angle to the HUD 1 as the road surface information as well. Meanwhile, the HUD controller 20 may be configured to calculate the road surface angle $\theta_r$. In a third embodiment which will be described later, the road surface information only includes the road surface angle $\theta_r$.

The "three-axis rectangular coordinate system in the real space" is defined by a two-axis rectangular coordinate system included in the ground surface 200 (x-z coordinate system) and the y-axis perpendicular to the two-axis rectangular coordinate system. The x-axis corresponds to the lateral axis of the vehicle 2, z-axis corresponds to the longitudinal axis along the traveling direction of the vehicle 2, and the y-axis corresponds to the height direction axis from the ground surface 200.

The image processing device 700 detects an obstacle located in front of the vehicle 2 based on the output (captured image) from the camera 70, and the HUD 1 acquires virtual image display target object information indicating a type and a position of the obstacle.

The navigation device 800 calculates a current position of the vehicle 2 based on the output from the GPS receiver 80 (GPS radio waves), and the HUD 1 acquires positional information of the vehicle 2.

The HUD controller 20 includes a first ECU (Electric Control Unit) 21, a first nonvolatile memory (ROM) 22, a memory (RAM) 23, a light source adjustment unit 24, a distortion correction unit 25, a display element control unit 26, a first CAN communication unit 27, and a concave mirror control unit 28. The first CAN communication unit 27 is connected to the road surface estimation device 600, the image processing device 700, and the navigation device 800, respectively, via the CAN 90. The light source adjustment unit 24 is connected to the light source 31, the distortion correction unit 25 is connected to the display element control unit 26, and the display element control unit 26 is connected to the display element 33. The concave mirror control unit 28 is connected to the concave mirror drive unit 42.

The road surface estimation device 600 is configured by connecting a second ECU 601, a second CAN communication unit 602, and a LiDAR control unit 603. An input stage of the second ECU 601 is connected to an output stage of the LiDAR 60, and the output of the LiDAR 60 (measurement point data) is input to the second ECU 601.

Each measurement point data includes a value obtained by calculating a distance and a position to the measurement point based on light intensity and a laser flight time of a reflected wave received from a point (measurement point) of the front road surface 210 where a laser light, which is irradiated toward the front road surface 210 by the LiDAR 60, hits.

The second ECU 601 calculates the estimation formula for a plane including three or more pieces of the measurement point data and the angle (road surface angle $\theta_r$) formed by the plane with respect to the ground surface 200, and transmits the calculation result as the road surface information through the second CAN communication unit 602 to the HUD controller 20.

An output stage of the second ECU 601 is connected to an input stage of the LiDAR 60 via the LiDAR control unit 603. The second ECU 601 outputs a control signal to the LiDAR 60 via the LiDAR control unit 603.

The image processing device 700 is configured by connecting a third ECU 701, a third CAN communication unit 702, and a camera control unit 703. An input stage of the third ECU 701 is connected to an output stage of the camera 70, and the captured image generated by the camera 70 is input to the third ECU 701. The third ECU 701 performs image recognition processing on the captured image to determine whether a subject of the captured image is the virtual image display target object, for example, a course display object or an obstacle. When the subject is the virtual image display target object, the third ECU 701 transmits the virtual image display target object information indicating the type and the position thereof to the HUD controller 20 through the third CAN communication unit 702.

An output stage of the third ECU 701 is connected to an input stage of the camera 70 via the camera control unit 703. The third ECU 701 outputs a control signal to the camera 70 via the camera control unit 703.

The navigation device 800 is configured by connecting a fourth ECU 801, a fourth CAN communication unit 802, and a fourth nonvolatile memory 803. An input stage of the fourth ECU 801 is connected to the GPS receiver 80, and the fourth ECU 801 calculates a current position of the vehicle 2 based on the GPS radio waves received from the GPS receiver 80 and transmits the positional information to the HUD controller 20 through the fourth CAN communication unit 802. The fourth ECU 801 may be configured to calculate a route to a destination of the vehicle 2 and transmit route information to the HUD controller 20. In the following, the positional information and the route information are collectively referred to as course information.

An output stage of the fourth ECU 801 is also connected to the fourth nonvolatile memory 803, and the position signal is accumulated therein along the time series. The fourth ECU 801 may be configured to read out the previous positional information and obtain the time-series change of the positional information so as to calculate the traveling direction of the vehicle 2. Furthermore, the fourth ECU 801 may be configured to execute dead reckoning processing based on the previous positional information, correct the current position obtained from the GPS radio waves by using the result, and output the corrected current position to the HUD controller 20. The fourth nonvolatile memory 803 may store map information.

The travel controller 500 includes a fifth ECU 501 and a fifth CAN communication unit 502. The fifth ECU 501 acquires the road surface information, the virtual image object information, and the course information from the fifth CAN communication unit 502 via the CAN 90, and outputs control signals to the travel drive device 400. In this connection, an alarm 450 may be connected to the travel controller 500. The fifth ECU 501 executes collision possibility determination processing by using the virtual image display target object information, and if there is a risk of collision, outputs an alarm signal to the alarm 450. In this case, alarm notification by the alarm 450 may be synchronized with virtual image display for an obstacle of the HUD 1, which will be described later. Each of the light source adjustment unit 24, the distortion correction unit 25, the display element control unit 26, the concave mirror control unit 28, the LiDAR control unit 603, the camera control unit 703, and a scanning mirror control unit 26a used in a fourth embodiment which will be described later, may be configured by cooperating an arithmetic element such as a CPU or an MPU with a program executed by the arithmetic element, or may be configured as a control circuit that realizes functions of each unit. Each of the communication units from the first CAN communication unit 27 to the fifth CAN communication unit 502 are configured by appropriately combining a communication unit for connection with the CAN 90, a communication interface, and driver software.

Figure 3:
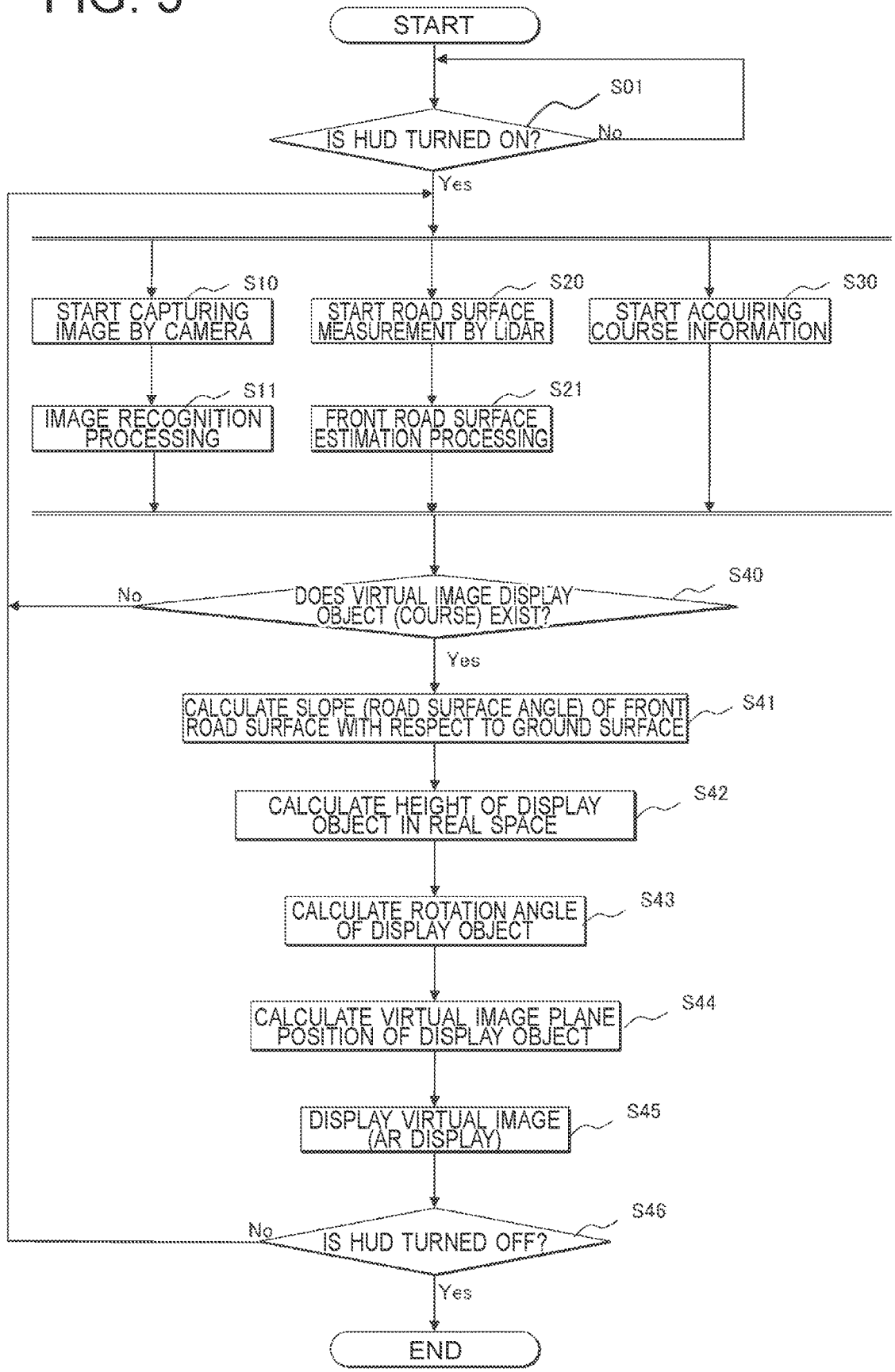
FIG. 3 illustrates a flow chart of a flow of virtual image display processing by an HUD.

FIG. 3 illustrates a flow chart of a flow of virtual image display processing by the HUD 1.

When a main power of the HUD 1 is turned on (step S01/Yes), the camera 70 starts capturing an image (step S10), the LiDAR 60 starts road surface measurement (step S20), the GPS receiver 80 receives GPS radio waves, and the navigation device 800 starts acquisition of route information (step S30). The HUD 1 is in a standby state until the main power of the HUD 1 is turned on (step S01/No).

The image processing device 700 reads a captured image from the camera 70 and performs image recognition processing (step S11). Here, the image recognition processing is performed for detecting a subject reflected in the captured image and determining whether the subject is a subject which is a virtual image display target object of the HUD 1. In the first embodiment, it is assumed that the virtual image display target object is a route display object. Accordingly, the third ECU 701 determines whether at least one of the front road surface, an intersection, a branch point, a junction point, and a corner is reflected on the captured image, and when at least one of them is reflected on the captured image, outputs the virtual image display target object information to the CAN 90.

The road surface estimation device 600 acquires measurement point data from the LiDAR 60 and estimates the front road surface (step S21). Then, the road surface estimation device 600 outputs, to the HUD controller 20, the road surface information of the front road surface 210 with respect to the ground surface 200 on which the vehicle 2 contacts.

The navigation device 800 generates course information including the current position and the traveling direction of the vehicle 2 based on the GPS radio waves from the GPS receiver 80 and outputs the course information to the HUD controller 20.

When determining that a virtual image display target object exists based on the virtual image display target object information (step S40/Yes), the road surface estimation device 600 calculates a road surface angle $\theta_r$ of the front road surface 210, which has been estimated by the road surface estimation device 600, with respect to the ground surface 200 (step S41). The road surface angle $\theta_r$ (see FIG. 4) has the same meaning as the slope of the front road surface 210 with respect to the ground surface 200.

The HUD controller 20 calculates the height of the display object in the real space based on the road surface angle $\theta_r$ obtained in step S41 (step S42). Furthermore, the HUD controller 20 calculates a display object rotation angle for displaying the virtual image 101 of the display object (see FIG. 1) along the front road surface 210 having the slope (step S43). Details of the display object rotation angle will be described later.

Still further, the HUD controller 20 calculates a virtual image plane position $P'''_{oi}$ (see FIG. 7) on the virtual image plane 100, which is a position where the virtual image 101 of the display object is to be displayed, based on the slope obtained in step S41 (step S44). Detailed processing contents of each step will be described later.

Thereafter, the HUD controller 20 displays the display object at a position on a display surface of the display element 33 corresponding to the virtual image surface position P'''$_{oi}$, and emits the image light L so as to display the display object as the virtual image 101 (corresponding to AR display) (step S45). Since the virtual image 101 is displayed on an intersection point between the virtual image plane 100 and a line of sight at which the driver 5 views the virtual image display target object, the display object can be superimposed on or brought close to the virtual image display target object (for example, a road surface or an obstacle) by performing AR display.

When the HUD 1 is not turned off (step S46/No), the processing returns to steps S10, S20, and S30 and is continued. On the other hand, when the HUD 1 is turned off (step S46/Yes), the processing is terminated.

(Step S21: Front Road Surface Estimation Processing)

Figure 4A:
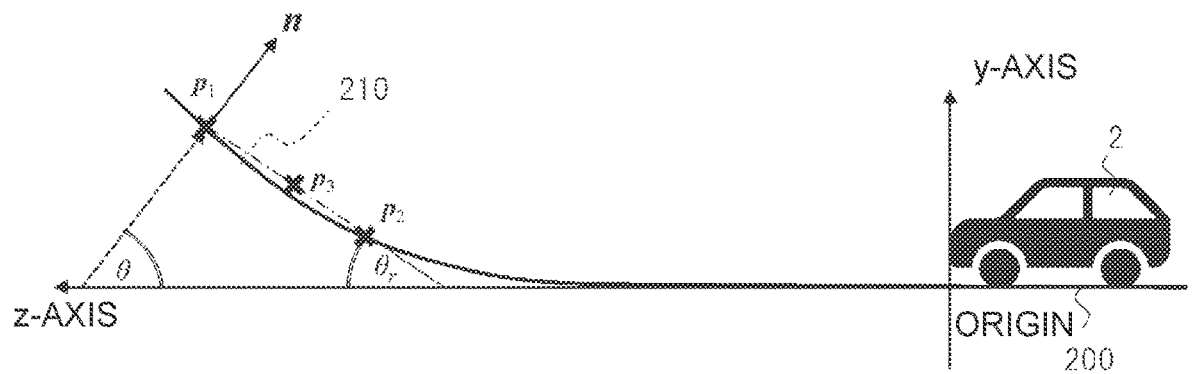
FIG. 4A illustrates an outline of estimation processing for a front road surface (y-z plane).
Figure 4B:
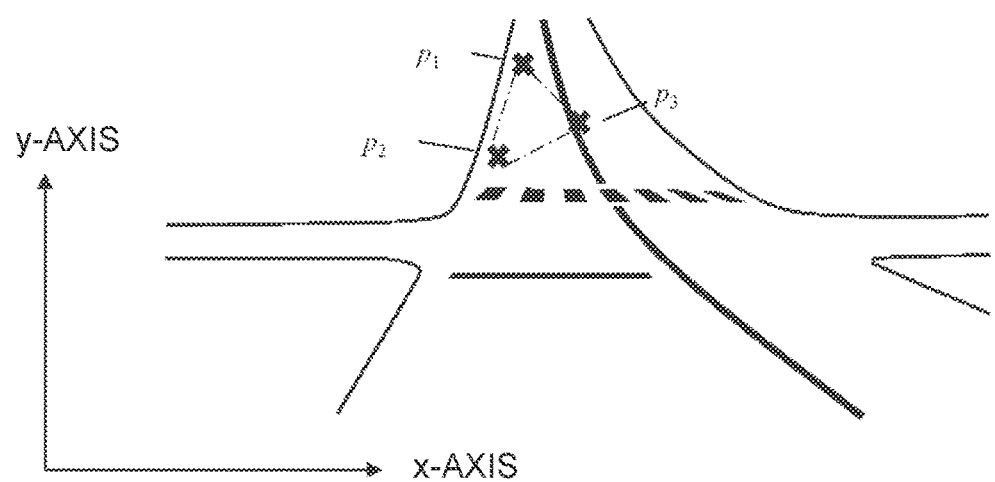
FIG. 4B illustrates an outline of estimation processing for a front road surface (x-y plane).

FIG. 4A illustrates an outline of the estimation processing of the front road surface 210 (y-z plane), and FIG. 4B illustrates an outline of the estimation processing of the front road surface 210 (x-y plane). Each of the x-axis, the y-axis, and the z-axis in FIG. 4A and FIG. 4B is an axis which forms the three-axis rectangular coordinate system in the real space as described above. The origin of the three-axis rectangular coordinate system is positioned on the road surface which is forwardmost from the vehicle 2, in other words, on a plane extending the ground surface 200 at infinity.

It is assumed that the measurement point of the front road surface 210 measured by the LiDAR 60 on the three-dimensional real space is $P_i$ (i=1, 2, 3, ... ). The coordinates of the measurement point $P_i$ is formed by ($x_i$, $y_i$, $z_i$). FIG. 4A and FIG. 4B illustrate three measurement points $P_1$, $P_2$, $P_3$. When a plane A including each measurement point $P_1$, $P_2$, $P_3$ is "ax+by +cz=d", a, b, c, and d can be calculated by the mathematical formula (1) below.

$$\left. \begin{array}{l} P_{12} \times P_{13} = (a, b, c)^T \\ d = ax_1 + by_1 + cz_1 \end{array} \right\} \quad (1)$$

Where, $P_{12}$ is a vector with $P_1$ and $P_2$, and $P_{13}$ is a vector with $P_3$. Multiplication × expresses an outer product operation.

(Step S41: Calculation Processing of Road Surface Angle $\theta_r$ of Front Road Surface 210 with Respect to Ground Surface 200)

Since the z-axis is included in the ground surface 200, the slope of the front road surface 210 with respect to the ground surface 200, in other words, the road surface angle $\theta_r$ can be expressed by the slope with respect to the z-axis in FIG. 4. Since the normal vector of the plane A including the front road surface 210 is "n=(a, b, c)$^T$", the road surface angle $\theta_r$ of the front road surface 210 can be calculated by the mathematical formula (2) below.

$$\left. \begin{array}{l} \cos \theta = \dfrac{c}{|n|} \\ |n| = \sqrt{a^2 + b^2 + c^2} \\ \theta = \cos^{-1} \dfrac{c}{|n|} \\ \theta_r = \dfrac{\pi}{2} - \theta \end{array} \right\} \quad (2)$$

(Step S42: Height of Display Object in Real Space)

Figure 5:
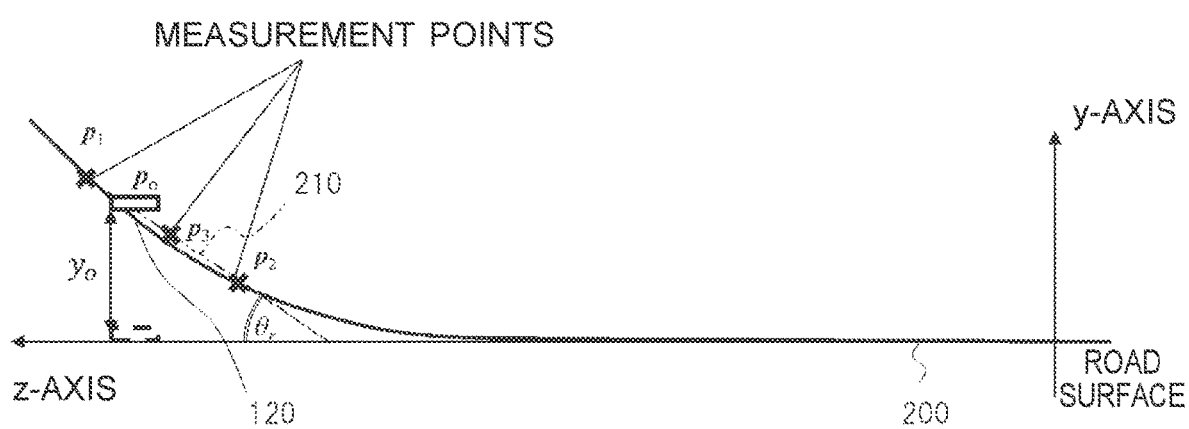
FIG. 5 illustrates a three-dimensional position in a real space in which a display object is to be drawn (y-z plane).

FIG. 5 illustrates a three-dimensional position in the real space in which the display object is to be drawn (y-z plane).

In FIG. 5, the display object 120 is not along the front road surface 210 and is displayed in the same shape as the ground surface 200 without considering the slope. The display object height can be obtained by using the road surface angle $\theta_r$, meanwhile, the processing for obtaining the display object height by using a plane estimation formula will be described below since the case of obtaining the display object height by using the plane estimation formula is easier to be understood.

In FIG. 5, it is assumed that a position in the depth direction of the three-dimensional position $P_o$ in the real space in which the display object is to be drawn is $z_o$, a position in the horizontal direction thereof is $x_o$, and a position in the height direction thereof is $y_o$. The position $y_o$ in the height direction can be calculated based on the estimation formula for the plane A by using the mathematical formula (3) below.

$$y_o = \frac{d - ax_o - cz_o}{b} \quad (3)$$

Where, the three-dimensional position in the real space in which the display object is to be drawn is $P_o=(x_o, y_o, z_o)$.

(Step S43: Calculation of Rotation Angle of Display Object)

Figure 6A:
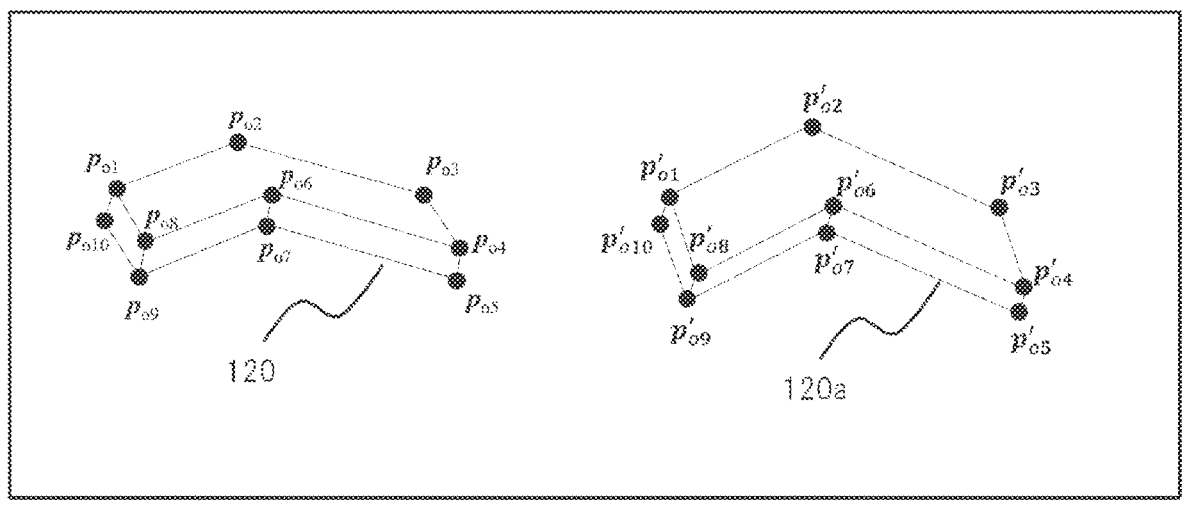
FIG. 6A illustrates a shape of a display object parallel to a ground surface (left in FIG. 6A; basic shape) and shape of the display object obtained by rotating the basic shape thereof in accordance with a road surface angle (right in FIG. 6A; rotation shape).
Figure 6B:
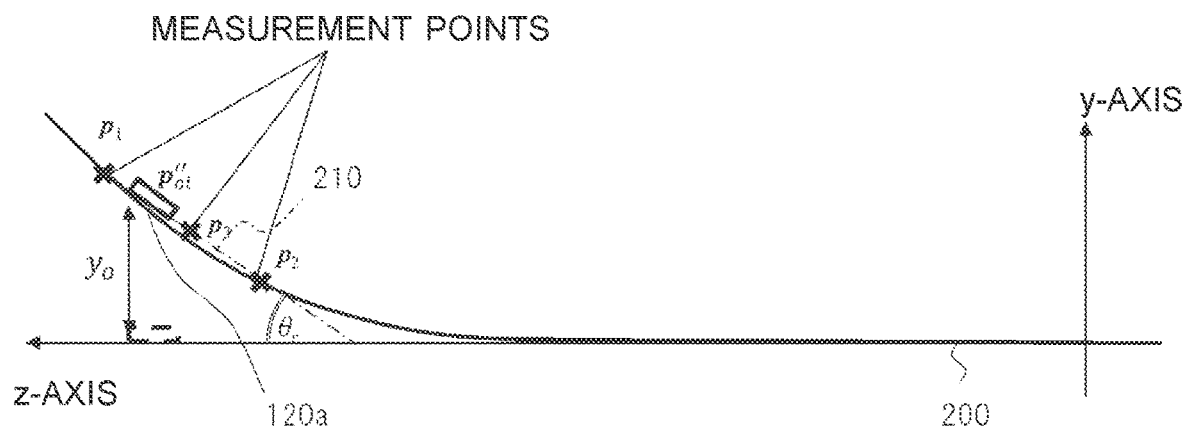
FIG. 6B illustrates a state where a display object is displayed along a front road surface (y-z plane).

FIG. 6A illustrates a shape of a display object parallel to the ground surface 200 (left in FIG. 6A; basic shape) and a shape of the display object obtained by rotating the basic shape thereof in accordance with a road surface angle (right in FIG. 6A; rotation shape). FIG. 6B illustrates a state where the display object 120 is displayed along the front road surface 210 (y-z plane).

As illustrated in FIG. 6A, in order to display the points $P_{oi}=(x_{oi}, y_{oi}, z_{oi})^T$ (i=1, 2, 3, ... ) on the display object 120 (basic shape), which is displayed on the ground surface 200, along the front road surface 210 inclined at the road surface angle $\theta r_i$ the points $P_{oi}$ are rotated based on the road surface angle $\theta_r$ by using the mathematical formula (4) below so as to obtain the coordinates of the points P'$_{oi}$. The points P'$_{oi}$ are points on a display object 120a after the rotation. In the following, it is assumed that the center of gravity of the virtual image of the display object 120 is positioned at the origin.

$$p_{oi} = \begin{pmatrix} 1 & 0 & 0 \\ 0 & \cos\theta_r & \sin\theta_r \\ 0 & -\sin\theta_r & \cos\theta_r \end{pmatrix} \begin{pmatrix} x_{oi} \\ y_{oi} \\ z_{oi} \end{pmatrix} \quad (4)$$

By performing the steps above, the display object 120 is rotated in accordance with the road surface angle $\theta_r$ of the front road surface 210 with respect to the ground surface 200 by using the measurement point data from the LiDAR 60 mounted on the vehicle 2. As illustrated in FIG. 6B, the display object 120a after the rotation is moved to the position P''$_{oi}$ on the front road surface 210 at which the display object 120a is to be displayed. In this connection, the position P''$_{oi}$ has the coordinates expressed by the three-axis rectangular coordinate system in the real space. The coordinates of P''$_{oi}$ can be expressed by the mathematical formula (5) below.

$$p''_{oi} = p'_{oi} + p_0 \quad (5)$$

(Step S44: Calculate Virtual Image Plane Position of Display Object)

Figure 7:
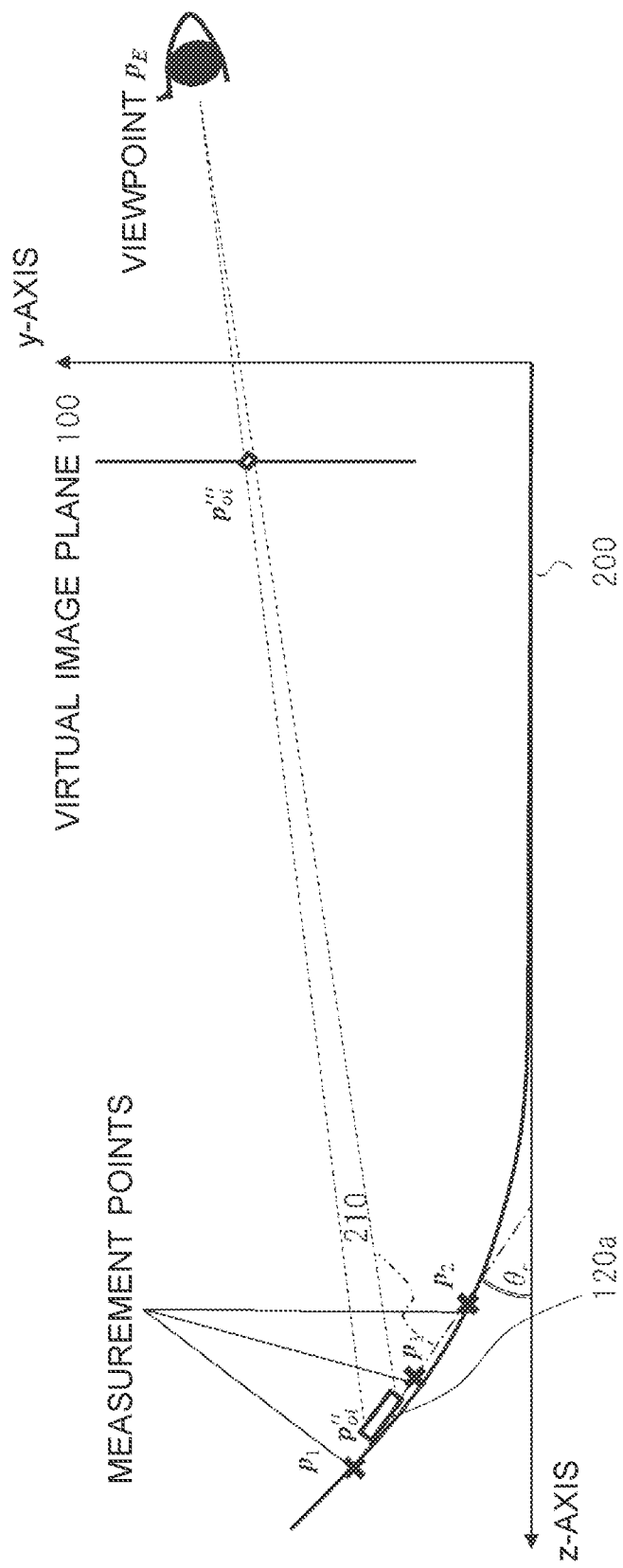
FIG. 7 illustrates a position on a virtual image plane for displaying a virtual image (virtual image plane position $P'''_{oi}$) in order to display the virtual image of a display object after rotation along a front road surface (y-z plane).

FIG. 7 illustrates a position on the virtual image plane 100 for displaying the virtual image (virtual image plane position $P'''_{oi}$) in order to display the virtual image of the display object 120a after the rotation along the front road surface 210 (y-z plane). When the virtual image plane 100 in the real space is "ex+fy+gz=h" and the viewpoint is $P_E$, the position $P'''_{oi}$ of the display object on the virtual image plane can be obtained by the mathematical formula (6) below. It is preferable that the coordinates of the viewpoint $P_E$ on the three-axis rectangular coordinate system in the real space are the coordinates of the actual viewpoint of the driver 5 of the vehicle 2, meanwhile, in the present embodiment, a fixed value (for example, may be a design value such as the center coordinates of the eyelips) is used for convenience of explanation, and it is assumed that the three-axis rectangular coordinates of the viewpoint $P_E$ in the real space is provided in advance. In this connection, as another mode, it may be configured to connect a viewpoint detection device for detecting the viewpoint of the driver 5 to the HUD 1 so as to utilize the coordinates of the viewpoint $P_E$ defined by the three-axis rectangular coordinate system detected by the viewpoint detection device.

$$p'''_{oi} = p_E + \frac{h - (ex_E + fy_E + gz_E)}{(e(x''_{oi} - x_E) + f(y''_{oi} - y_E) + g(z''_{oi} - z_E))}(p''_{oi} - p_E) \quad (6)$$

(Step S45: Virtual Image Display)

Figure 8:
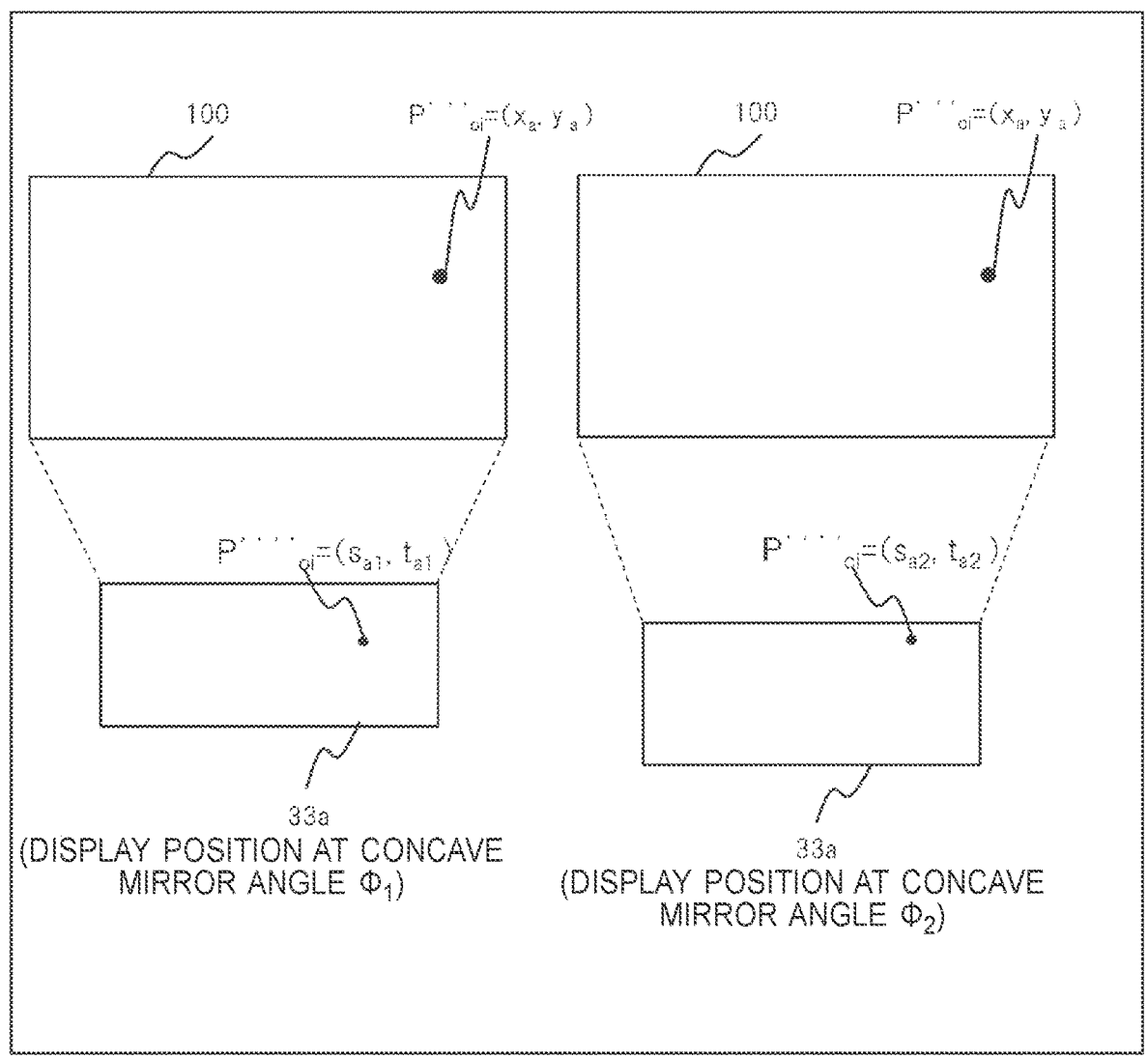
FIG. 8 illustrates positional relationship between a virtual image plane position and a position on a display surface of a display element.

FIG. 8 illustrates positional relationship between the virtual image plane position and a position on a display surface 33a of the display element 33. The virtual image plane-and-display surface linkage data, which will be described later, is the relationship illustrated in FIG. 8, that is, the data in which the x-z coordinates on the virtual image plane and the s-t coordinates within the display surface are linked with each other.

The light emitted from the light source 31 is transmitted through the display surface 33a of the display element 33, whereby the image light L including the virtual image is generated. Accordingly, the area of the virtual image plane 100 is expanded as the image light L is diffused, and the display position within the virtual image plane 100 (virtual image plane position $P'''_{oi}$) and the corresponding display position on the display surface 33a of the display element 33 are uniquely determined.

Accordingly, the display object is displayed on the display surface 33a of the display element 33, and the display position $P'''_{oi}$ at that time is expressed by a two-axis rectangular coordinate system (s-t coordinate system) on the display surface 33a. In addition, the coordinates of the virtual image plane position $P'''_{oi}$ at which the virtual image of the display object displayed on the display position $P''''_{oi}$ is displayed are expressed by the x-y coordinates in the three-axis rectangular coordinate system in the real space. Then, the virtual image plane-and-display surface linkage data in which the s-t coordinates of the display position $P''''_{oi}$ and the x-y coordinates of the virtual image plane position $P'''_{oi}$ are linked with each other is generated.

The virtual image plane-and-display surface linkage data is stored in a calibration data storage unit 22a configured by a partial region of the first nonvolatile memory 22.

When obtaining the virtual image plane position $P'''_{oi}$ based on the mathematical formula (6), the first ECU 21 refers to the virtual image plane-and-display surface linkage data to convert the virtual image plane position $P'''_{oi}$ into the display position $P''''_{oi}$ on the display surface 33a. Thereafter, the first ECU 21 outputs the display object 120a after the rotation and the display position $P''''_{oi}$ on the display element 33 to the distortion correction unit 25. The distortion correction unit 25 outputs the display object 120a after the rotation and correction and the display position $P''''_{oi}$ on the display surface 33a to the display element control unit 26. The display element control unit 26 drives the display element 33 so as to display the display object 120a after the rotation on the display position $P''''_{oi}$ of the display surface 33a.

Then, the first ECU 21 outputs an instruction for lighting the light source 31 to the light source adjustment unit 24, and the light source adjustment unit 24 turns on the light source 31. Accordingly, the light source 31 outputs an emission light, and the image light L including the display object displayed on the display position $P''''_{oi}$ of the display surface 33a is emitted from the HUD 1. By the image light L, the display object 120a after the rotation is displayed on the position $P'''_{oi}$ of the virtual image plane 100 as a virtual image. The virtual image plane-and-display surface linkage data in FIG. 8 shows an example of data when the concave mirror 41 is rotated by a certain angle, for example, $\varphi_1$. When the concave mirror angle $\varphi_1$ is changed, even if the position $P'''_{oi}$ of the virtual image plane 100 remains the same, the display position of the display object on the display surface 33a corresponding thereto is changed. For example, in the case of the concave mirror angle $\varphi_1$, the position $P'''_{oi}$ of the virtual image plane 100 is expressed as $(s_{a1}, t_{a1})$ in the s-t coordinate system of $P''''_{oi}$ while in the case of the concave mirror angle $\varphi_2$, it is expressed as $(s_{a2}, t_{a2})$. Accordingly, a plurality of pieces of virtual image plane-and-display surface linkage data$_i$ corresponding to the concave mirror angle $\varphi_i$ is stored in advance in the calibration data storage unit 22a, and the first ECU 21 reads out the virtual image plane-and-display surface linkage data$_i$ by referring to a signal for controlling the concave mirror angle $\varphi_i$ outputted to the concave mirror control unit 28, and calculates the display position of the display object 120a on the display surface 33a.

Figure 9:
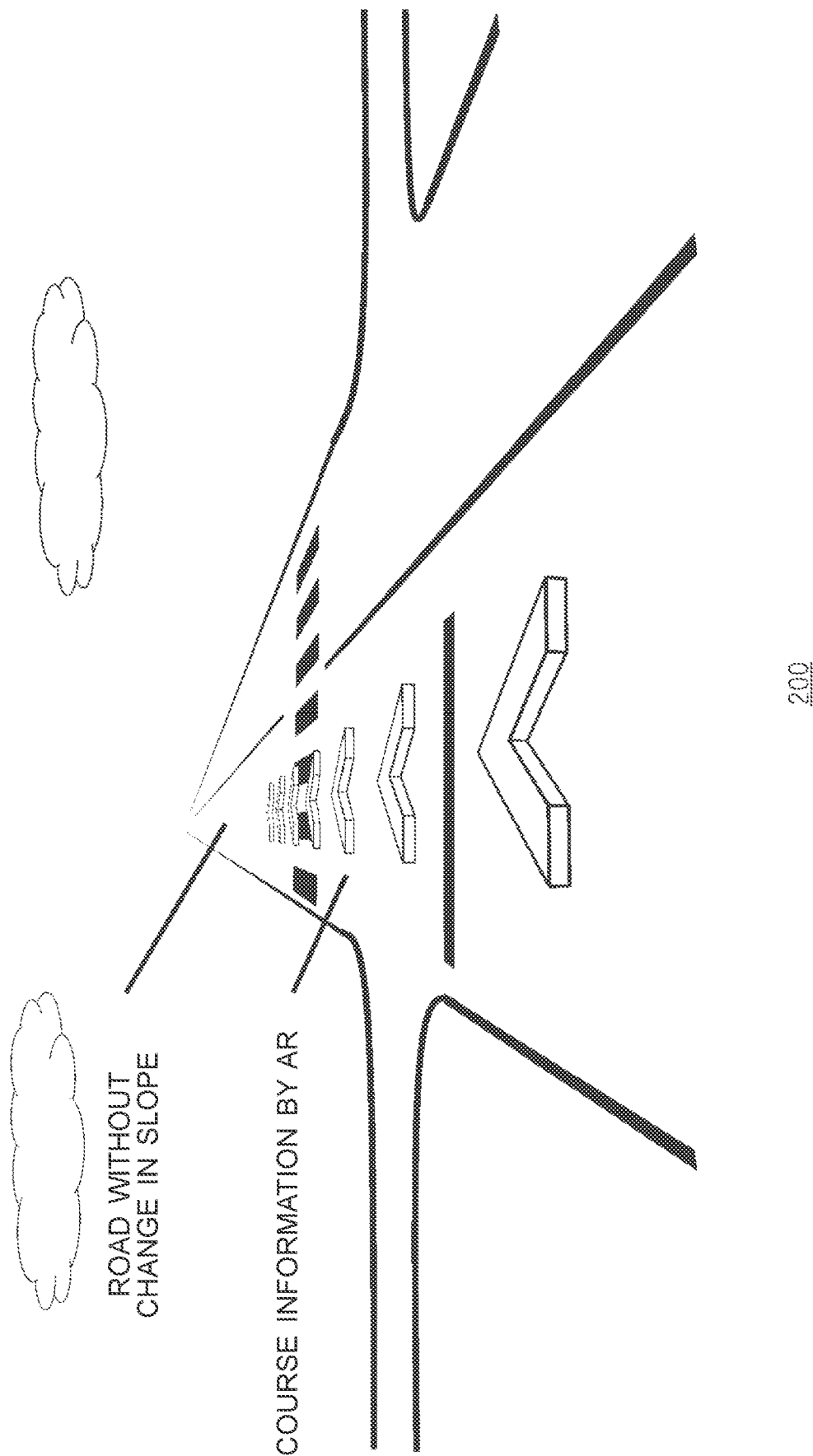
FIG. 9 illustrates an example in which AR display is performed for a front road surface without change in slope.
Figure 10:
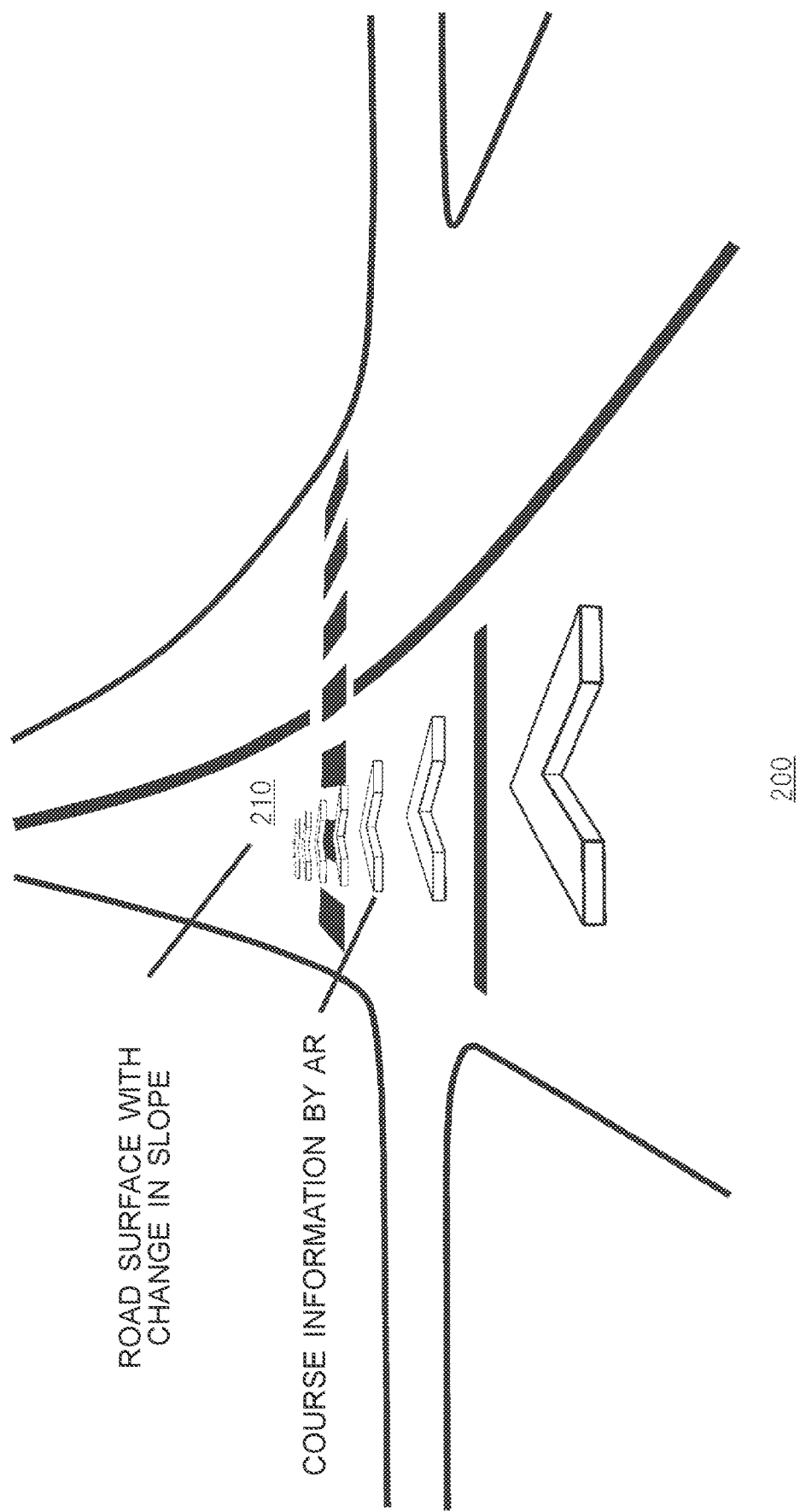
FIG. 10 illustrates an example in which AR display is performed for a front road surface having change in slope, without considering the slope.

With reference to FIGS. 9 to 11, an effect of the present embodiment will be described by comparing the present embodiment with the prior art.

FIG. 9 illustrates an example in which AR display is performed for the front road surface without change in slope (prior art). In FIG. 9, arrows indicating the traveling direction are displayed along the front road surface that is on the same plane as that of the ground surface 200.

FIG. 10 illustrates an example in which the AR display is performed for the front road surface 210 having slope, without considering the slope. The front road surface 210 has upward slope with respect to the ground surface 200, and thus the front road surface 210 is present at a higher position than the ground surface 200 in the real space. When the AR display is performed for the front road surface 210 without considering the slope, each display object of the arrows appears as if it pierces or penetrates the front road surface 210.

FIG. 11 illustrates an example in which the AR display is performed for the front road surface having change in slope, with considering the slope (corresponding to the present embodiment). As illustrated in FIG. 11, by changing the display height of the display object with considering the slope (road surface angle $\theta_r$) with respect to the front road surface 210 having change in slope and rotating the display object for display, it is possible to display each display object of the arrows along the front road surface 210 without being appeared to pierce or penetrate the front road surface 210.

According to the present embodiment, the output from the LiDAR 60 is used to obtain the road surface angle $\theta_r$ of the front road surface 210, and the basic shape of the display object is rotated based on the road surface angle $\theta_r$. Furthermore, the height of the display object for displaying the display object along the slope of the front road surface 210 is obtained, and the virtual image plane position of the display object for realizing the display above is calculated. By displaying the display object after the rotation at the display position $P''''_{oi}$ on the display surface 33a corresponding to the virtual image plane position $P''''_{oi}$ and emitting the image light L, even if the front road surface 210 has the slope with respect to the ground surface 200, it is possible to display the display object along the front road surface 210 as compared with the prior art.

Furthermore, according to the present embodiment, the road surface angle $\theta_r$ of the front road surface 210 with respect to the ground surface 200 is measured by using the output of the LiDAR 60 mounted on the vehicle 2, and the display position and the rotational angle of the display object are changed based on the measured road surface angle $\theta_r$, which may be realized by replacing the output of the LiDAR 60 with road surface shape information of a high-precision map. However, depending on the update frequency of the map, there is a possibility that a road state and the map information do not match with each other, and if the road state or road slope changes from the time when the map information is created to the current time, there is a possibility that correct road shape information of the current state cannot be acquired. On the other hand, according to the present embodiment, the road state and the road slope are followed in real time by successively acquiring road shape information so as to perform the AR display, and therefore, it is possible to realize the AR display more suited to the real scene while avoiding the AR display without reality, in which for example, the virtual image penetrating the front road surface 210 is displayed.

Second Embodiment

The second embodiment includes the technical feature in which the virtual image display target object is an obstacle such as pedestrians and vehicles. Since the three-dimensional coordinates of the detected obstacle can be estimated by using the position and the road surface information on the camera projection plane, when the image processing device 700 detects the obstacle such as pedestrians or vehicles, it is possible to perform the AR display with high accuracy.

The technical feature of the second embodiment can be found in the following three processes as compared with the first embodiment.

(First Process)
Link the road surface information acquired by the LiDAR 60 with the image captured by the camera 70.

(Second Process)
Obtain measurement points on which the obstacle (which is an example of the virtual image display target object) detected on the captured image exists.

(Third Process)
Display the virtual image of the display object to be added to the obstacle along the plane including the measurement points in the vicinity.

(Regarding First Process)
The first process is performed before start of the processes in FIG. 3. In the first process, camera-and-real space linkage data, in which coordinates of a camera coordinate system and coordinates of the three-axis rectangular coordinate system in the real space are linked with each other, is generated by installing a subject having known size at a known position to which the distance from the vehicle 2 is known, measuring the subject by each of the camera 70 and the LiDAR 60, and linking the subject in the captured image with positions of measurement points on the subject detected by the LiDAR 60.

The subject in the captured image can be expressed by the two-dimensional coordinates of the camera coordinate system. Accordingly, when the LiDAR 60 measures the measurement points on the same subject, the coordinates of the three-axis rectangular coordinate system in the real space of each measurement point can be obtained, whereby the camera-and-real space linkage data in which the coordinates of the three-axis rectangular coordinate system and the two-dimensional coordinates of the camera coordinate system are linked with each other can be obtained. Thus, the two-dimensional coordinates of the subject in the captured image, which is expressed by the camera coordinate system, and the three-axis rectangular coordinates of the subject detected by the LiDAR 60 are identified by using the camera-and-real space linkage data. Accordingly, it is possible to calculate the three-dimensional coordinates of the subject in the captured image.

The camera-and-real space linkage data is stored in the calibration data storage unit 22a, and is used in processing of determining the virtual image plane position of the display object, etc.

Figure 12A:
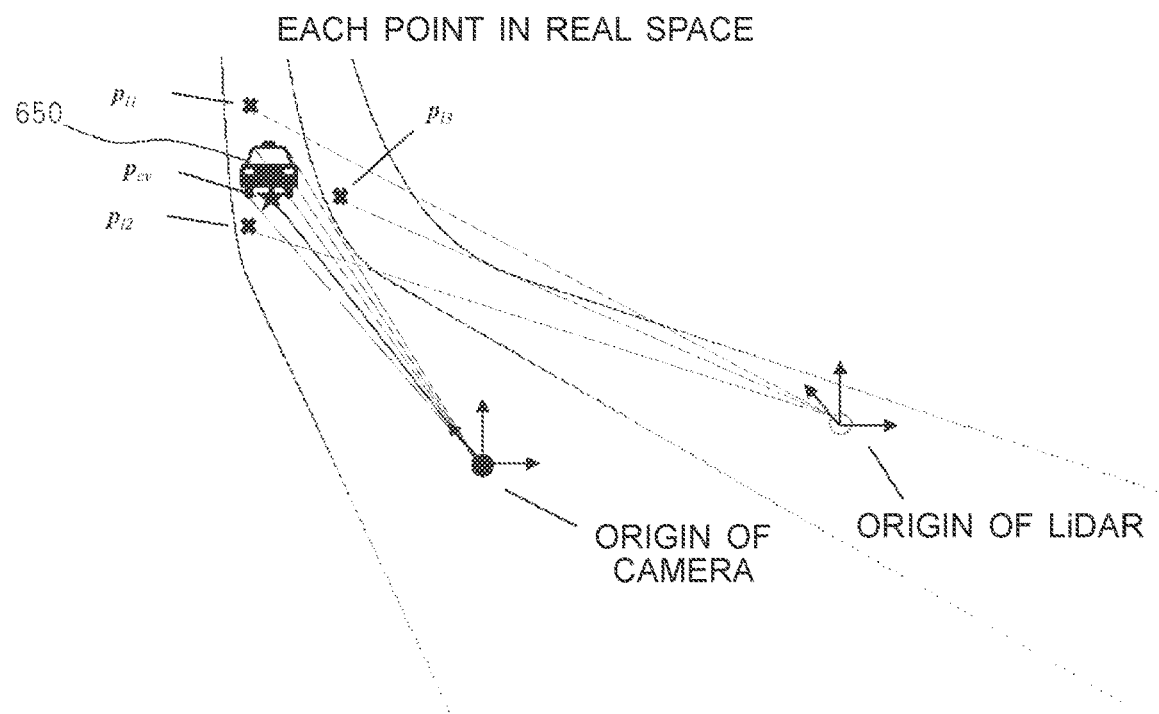
FIG. 12A illustrates a state where an obstacle is viewed in a LiDAR system.
Figure 12B:
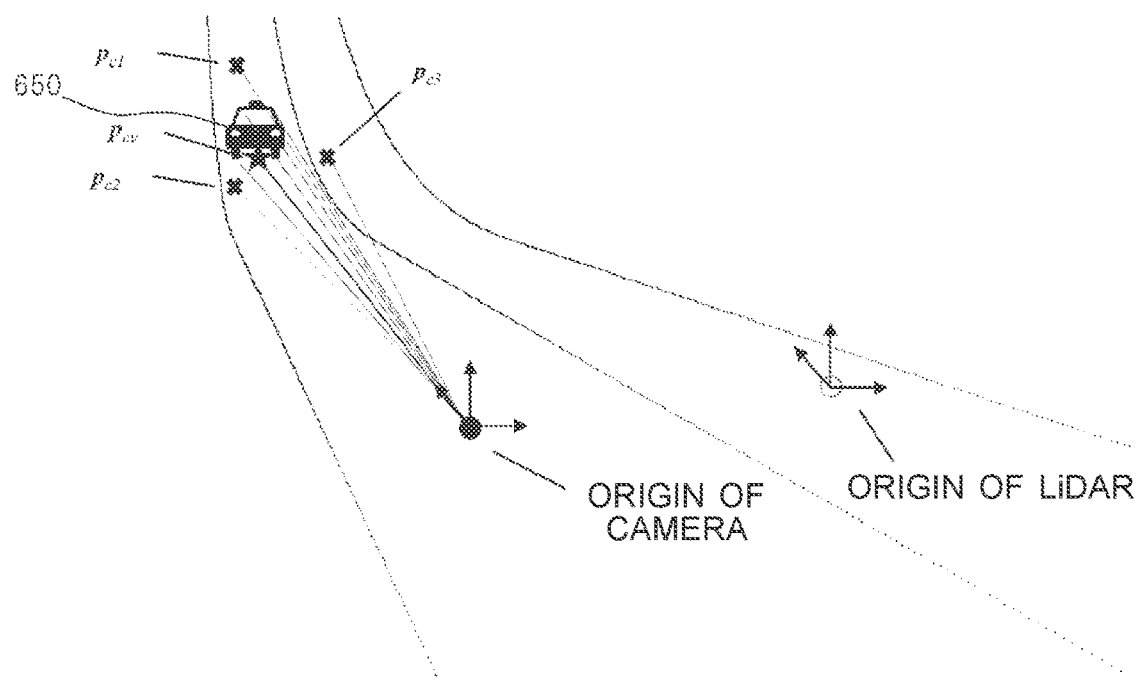
FIG. 12B illustrates a state where the same obstacle as that in FIG. 12A is viewed in a camera coordinate system.

Specifically, in the camera-and-real space linkage data, linkage between locations of pixels of the captured image by the camera 70 and locations of the measurement point data (group of points $p_l$ consisting of x, y, and z components) acquired by the LiDAR 60 is specified. Generally, since the installation position of the camera 70 is different from the installation position of the LiDAR 60, the camera coordinate system with a camera position as the origin and a LiDAR coordinate system with a LiDAR position as the origin are taken into consideration. FIG. 12A and FIG. 12B illustrate an outline of the first process. FIG. 12A illustrates a state where an obstacle 650 is viewed in the LiDAR coordinate system. FIG. 12B illustrates a state where the same obstacle 650 as that in FIG. 12A is viewed in the camera coordinate system. In FIG. 12A and FIG. 12B, the coordinates are provided with subscripts c and l, respectively.

FIG. 12A assumes a three-dimensional position $P_{li}$ (i=1, 2, 3) of the road surface measured by the LiDAR 60. FIG. 12B illustrates a three-dimensional position $P_{ci}$ (i=1, 2, 3) in the camera coordinate system.

It is assumed that the difference between the position of the LiDAR 60 and the position of the camera 70 is expressed by a translation vector t, and the difference of attitude therebetween is expressed by a rotation matrix R. The road surface position $P_{ci}$ in the camera coordinate system can be calculated by the mathematical formula (7) below.

$$P_{ci}=RP_{li}+t \tag{7}$$

Figure 13A:
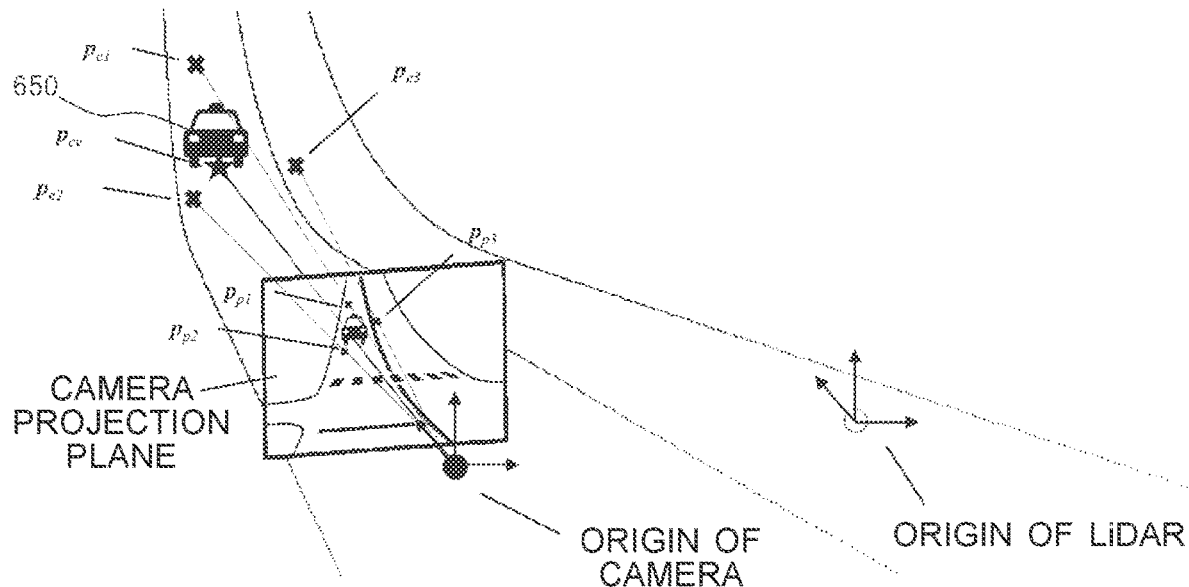
FIG. 13A illustrates processing for conversion from a road surface position on camera coordinates into a position on a camera projection plane.
Figure 13B:
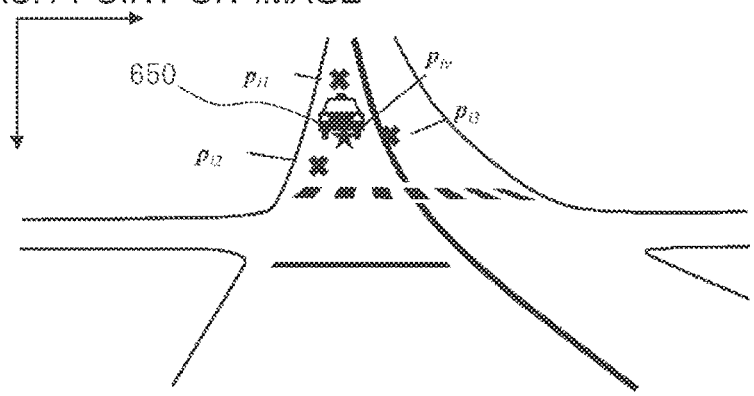
FIG. 13B illustrates processing for conversion from a position on a camera projection plane into a position on an image.

Next, as illustrated in FIG. 13A and FIG. 13B, the road surface position $p_{ci}$ on the camera coordinates is converted into the position $P_{pi}$ on the camera projection plane and the position $P_{li}$ on the image (FIG. 13B). When the focal length of the camera 70 is f, the position $P_{pi}$ on the camera projection plane can be calculated by the mathematical formula (8) below.

$$p_{pi} = f \frac{1}{z_{ci}} p_{ci} \qquad (8)$$

Furthermore, when the width of an image sensor of the camera is $w_S$ and the height thereof is $h_S$, and when the width of the image is $w_I$ and the height thereof is $h_I$, the position $P_{ii}$ on the image can be calculated by the mathematical formula (9) below.

$$p_{ii} = f \begin{pmatrix} \frac{w_I}{w_S} & 0 \\ 0 & \frac{h_I}{h_S} \end{pmatrix} p_{pi} + \begin{pmatrix} \frac{w_I}{2} \\ \frac{h_I}{2} \end{pmatrix} \qquad (9)$$

(Regarding Second Process)

As illustrated in FIG. 13B, in the second embodiment, the first ECU 21 confirms whether an obstacle $P_{iv}$ exists among the road surface positions $P_{i1}$, $P_{i2}$, $P_{i3}$ on the captured image in step S2. When all the mathematical formulas (10) to (12) are satisfied, the first ECU 21 determines that the obstacle $P_{iv}$ exists among the road surface positions $P_{i1}$, $P_{i2}$, $P_{i3}$.

$$(P\_i3-P\_i1) \times (P\_i\,v - P\_i1) < 0 \qquad (10)$$

$$(P\_i2-P\_i3) \times (P\_i\,v - P\_i3) < 0 \qquad (11)$$

$$(P\_i1-P\_i2) \times (P\_i\,v - P\_i2) < 0 \qquad (12)$$

*Where, multiplication×expresses an outer product operation.

(Regarding Third Process)

When the second process above is satisfied, the first ECU 21 determines that the obstacle exists on the plane A including $P_{i1}$, $P_{i2}$, $P_{i3}$ in step 40.

Since an intersection point between the plane A and a straight line connecting the camera origin and the obstacle position $P_{pv}$ on the camera projected plane is the position $P_{cv}$ of the obstacle in the real space, the first ECU 21 calculates the position $P_{cv}=(x_{cv}, y_{cv}, z_{cv})$ of the obstacle in the real space obtained in the second process by the mathematical formula (13). In the mathematical formula (13), $P_{cv}=(x_{cv}, y_{cv}, z_{cv})$ expresses the position of the obstacle on the camera projection plane.

$$\begin{aligned} p_{pv} &= \begin{pmatrix} \frac{w_S}{fw_I} & 0 & 0 \\ 0 & \frac{h_S}{fh_I} & 0 \\ 0 & 0 & f \end{pmatrix} \begin{pmatrix} x_{iv} - \frac{w_I}{2} \\ y_{iv} - \frac{h_I}{2} \\ 1 \end{pmatrix} \\ p_{cv} &= t p_{pv} \\ t &= \frac{d}{(ax_{pv} + by_{pv} + cz_{pv})} \end{aligned} \qquad (13)$$

(Step S44: Virtual Image Plane Position of Obstacle)

Figure 14:
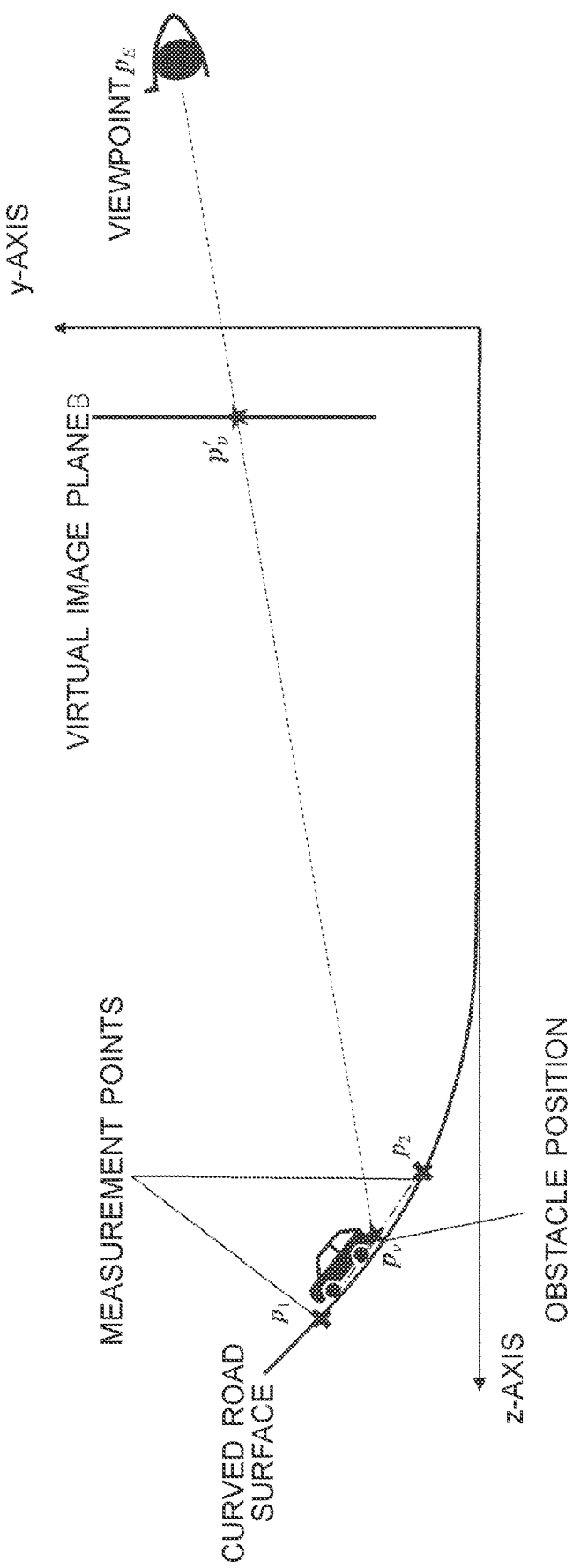
FIG. 14 illustrates a virtual image plane position of an obstacle (y-z plane).

FIG. 14 illustrates a virtual image plane position of the obstacle (y-z plane). The first ECU 21 of the HUD controller 20 obtains the position of the obstacle on the virtual image plane in the same manner as step S44 described above. Since the position $P_{cv}$ is the obstacle position with the camera position as the origin, the position $P_{cv}$ is converted into a position $P_v$ in the coordinate system defined in the first process by using the camera-and-real space linkage data obtained in the first process. When the difference of the position and orientation between the camera coordinates and the coordinate system defined in the first process is a translation vector $t_2$ and a rotation matrix $R_2$, the position $P_v$ is calculated by the mathematical formula (14) below.

$$P_v = R_2 P_{cv} + t_2 \qquad (14)$$

When the virtual image plane 100 in the real space is "ex+fy+gz=h" and the viewpoint is $P_E$, the position $P'_v$ of the obstacle on the virtual image plane 100 can be obtained by the mathematical formula (15) below.

$$p'_v = p_E + \frac{h - (ex_E + fy_E + gz_E)}{(e(x_v - x_E) + f(y_v - y_E) + g(z_v - z_E))} (p_v - p_E) \qquad (15)$$

According to the second embodiment, it is possible to perform the AR display even for the display object which appears irregularly like an obstacle and cannot be defined by the map information.

Figure 15A:
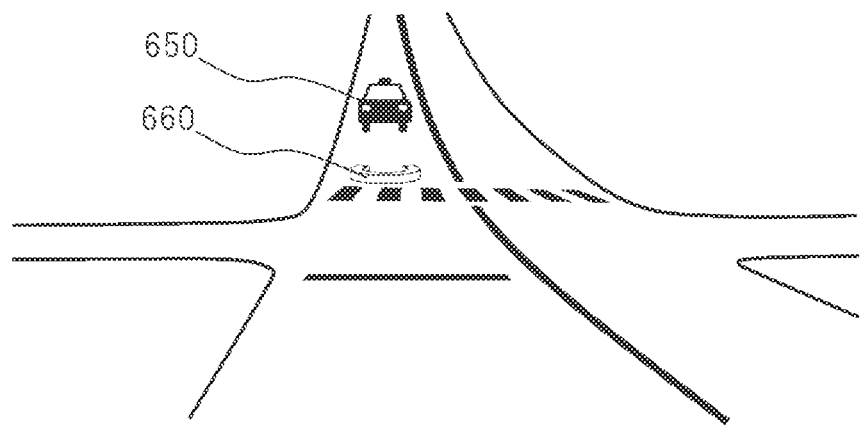
FIG. 15A illustrates an example in which AR display is performed for an obstacle without considering slope of a front road surface.
Figure 15B:
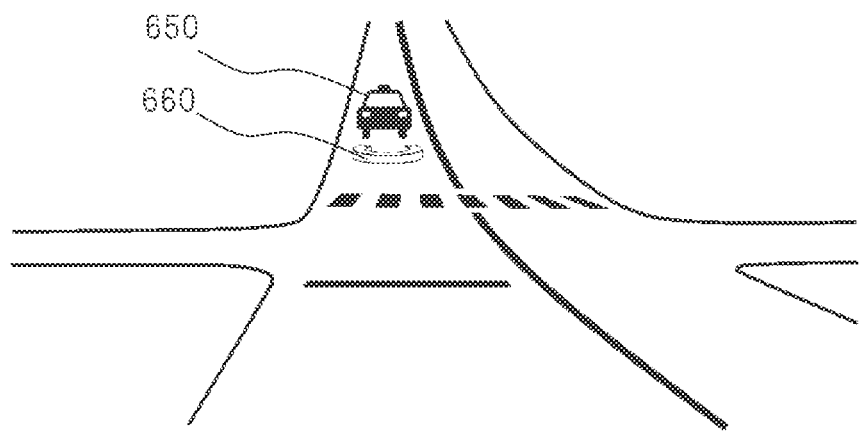
FIG. 15B illustrates an example in which AR display is performed for an obstacle with considering slope of a front road surface.

An effect of the AR display according to the second embodiment will be described by comparing the second embodiment with the prior art. FIG. 15A illustrates an example in which the AR display is performed for an obstacle without considering the slope of the front road surface. FIG. 15B illustrates an example in which the AR display is performed for the obstacle with considering the slope of the front road surface.

In the case of without considering the slope, as illustrated in FIG. 15A, a display object 660 is displayed separately from the obstacle 650 which is a forward vehicle. In contrast, according to the present embodiment, as illustrated in FIG. 15B, the display object 660 can be displayed closely to the obstacle 650. In FIG. 15B, the display object 660 is displayed closely to the obstacle 650, meanwhile, it is also possible to display the obstacle 650 by superimposing the display object 660 thereon.

Third Embodiment

Figure 16:
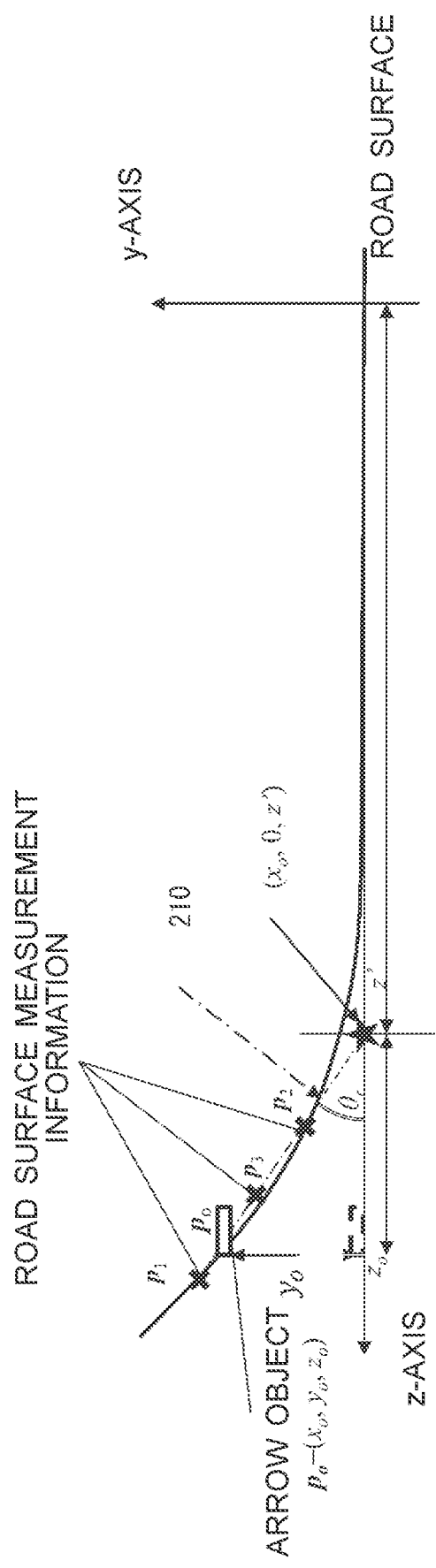
FIG. 16 illustrates processing for obtaining height of a display object in a real space according to a third embodiment.

In the first embodiment, the height of the display object in the real space is obtained based on the estimation formula of the front road surface which is expressed by the three-axis rectangular coordinate system. Meanwhile, the height of the display object in the real space also can be obtained by using the slope (road surface angle $\theta_r$) of the front road surface 210 with respect to the x-z axis (ground surface on which tires contact) in the three-axis rectangular coordinate system. FIG. 16 illustrates processing for obtaining the height of the display object in the real space according to the third embodiment.

In FIG. 16, it is assumed that a mathematics formula expressing the plane of the front road surface 210 is "ax+by+cz=d". The point of the position $x_0$ ($x_0$, 0, z') on the intersection line between the plane and the ground surface 200 can be expressed based on "$ax_0 + 0 + cz' = d$" by the mathematical formula (16) below.

$$z' = \frac{d - ax_0}{c} \qquad (16)$$

Next, the height $y_o$ of the display object in the real space is obtained by the mathematical formula (17) below.

$$\left.\begin{array}{l}\dfrac{y_o}{z_o - z'} = \tan\theta_r \\ y_o = (z_o - z')\tan\theta_r \\ z' \text{ is substituted} \\ y_o = \left(z_o - \dfrac{d - ax_o}{c}\right)\tan\theta_r\end{array}\right\} \quad (17)$$

Fourth Embodiment

Figure 17:
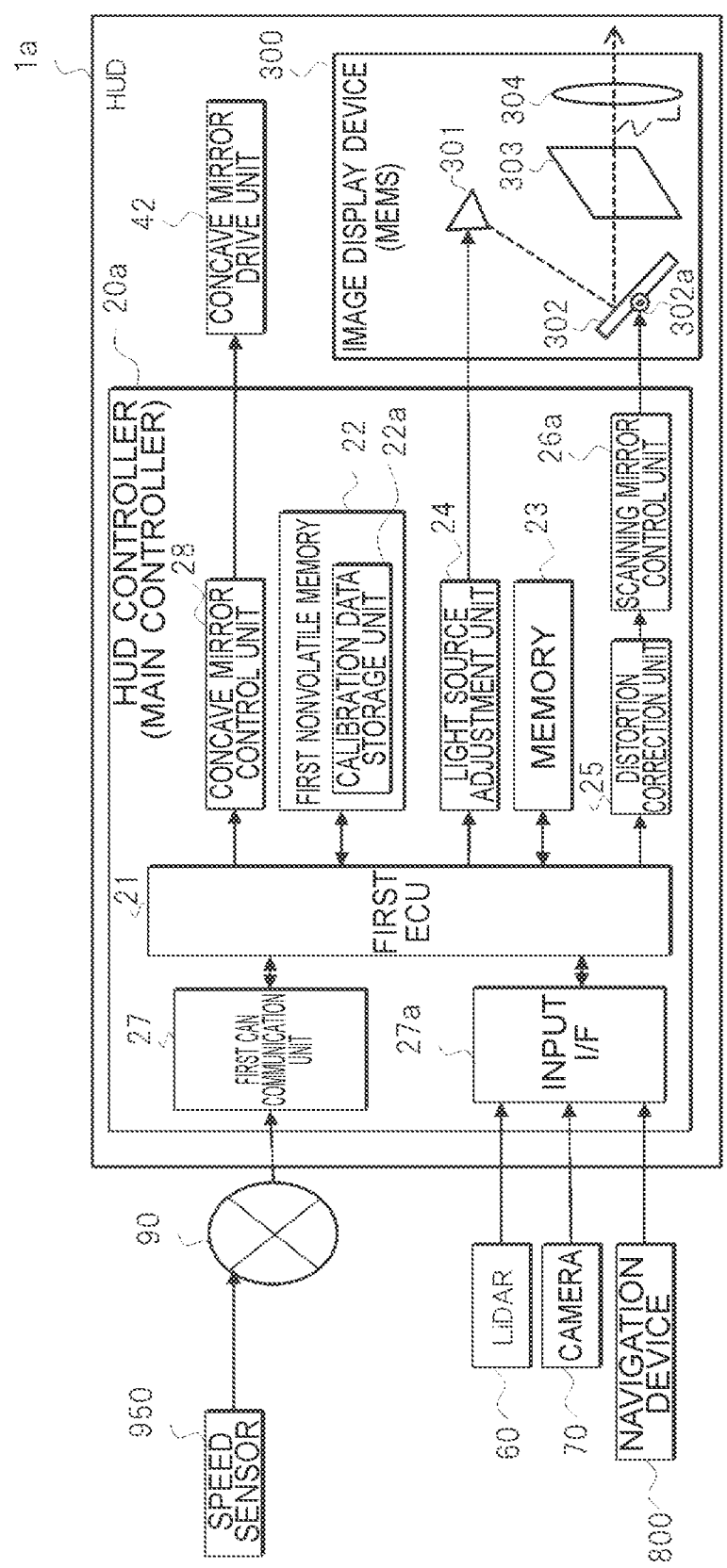
FIG. 17 is a system configuration diagram of an HUD according to a fourth embodiment.

In the first to third embodiments, the image display device 30 using an LCD is used. Meanwhile, the image display device 300 using a MEMS (Micro Electro Mechanical Systems) may be used. FIG. 17 is a system configuration diagram of the HUD according to the fourth embodiment.

An HUD 1a illustrated in FIG. 17 is configured by the image display device 300 using the MEMS. The MEMS includes a laser light source 301, a scanning mirror 302 that reflects a laser light, a scanning mirror drive unit (motor) 302a configured to change an angle of a mirror surface of the scanning mirror 302, a diffusion plate 303 using a microlens array, and a relay optical system 304 configured to receive the image light from the diffusion plate 303 and output the image light toward the concave mirror 41. The relay optical system 304 is a member that is provided in place of the lens unit 43 in FIG. 2.

The laser light irradiated from the laser light source 301 is reflected by the scanning mirror 302 and reaches the diffusion plate 303. The scanning mirror 302 irradiates the laser light to the diffusion plate 303 with a reflection angle thereof being changed. On the diffusion plate 303, the laser light forms an image once so that the display object can be visually recognized. Accordingly, the diffusion plate 303 corresponds to the display surface 33a. The light directed from the diffusion plate 303 to the relay optical system 304 corresponds to the image light L since it includes image information of the imaged display object.

An HUD controller 20a provided in the HUD 1a includes a scanning mirror control unit 26a in place of the display element control unit 26 of the HUD controller 20 according to the first embodiment. The light source adjustment unit 24 is connected to the laser light source 301 to perform blink control and light amount adjustment.

The scanning mirror control unit 26a drives and controls the scanning mirror drive unit 302a by rotating the scanning mirror 302 to change the orientation of the mirror surface. With this configuration, the position on the diffusion plate 303, at which the display object is displayed, is changed.

Furthermore, the HUD controller 20a includes an input I/F 27a. Each of the LiDAR 60, the camera 70, and the navigation device 800 is connected to the input I/F 27a. The first ECU 21 acquires the respective outputs from the LiDAR 60, the camera 70, and the navigation device 800 through the input I/F 27a, and performs image processing such as road surface estimation and obstacle detection, thereby realizing the AR display which is the same as that of the first embodiment.

Still further, the HUD controller 20a may be configured to acquire the vehicle information such as the traveling speed from a speed sensor 950 via the CAN 90 so as to provide the vehicle information by the AR display.

According to the present embodiment, the image display device 300 using the MEMS also can perform the AR display in accordance with the slope of the front road surface. Furthermore, even in the case of a vehicle that does not mount the automatic operation system 900 which is mounted in the first embodiment, by attaching various sensors to the HUD 1a, the AR display can be performed in accordance with the slope of the front road surface.

Each of the above-described embodiments does not limit the present invention, and various modifications within a scope that does not depart from the concept of the present invention belong to the technical scope of the present invention. For example, each mathematical formula used for explaining each processing is only one embodiment of the processing, and other mathematical formulas that produce calculation results necessary for the processing may be applied.

The road surface detection sensor is not limited to the LiDAR 60, and a millimeter-wave radar or a stereo camera can be used as long as it can detect the distance and position to a measurement point on the front road surface 210 (position in the lateral direction of the vehicle 2).

Furthermore, in place of the image display device 30 using the LCD according to the first to third embodiments, the image display device 300 using the MEMS may be used. Still further, in place of the image display device 300 using the MEMS according to the fourth embodiment, the image display device 30 using the LCD may be used.

REFERENCE SIGNS LIST

1: HUD
20: HUD controller (main controller)
60: LiDAR
70: camera
80: GPS receiver
100: virtual image plane
101: virtual image
200: ground surface
210: front road surface

The invention claimed is:

1. A head-up display for irradiating an image light including a display object toward a projection target member so as to display the display object as a virtual image, the head-up display comprising:
an image display device including a light source and a display element, the image display device being configured to output the image light generated by a light which has been emitted from the light source and transmitted through the display object displayed on a display surface of the display element; and
a main controller connected to the image display device, wherein
the main controller is configured to:
acquire road surface information of a front road surface based on a plurality of measurement points on the front road surface, the plurality of measurement points being detected by a road surface detection sensor mounted on a vehicle with the head-up display and being positioned forward of a traveling direction of the vehicle;
calculate, by using the road surface information, a virtual image plane position on a virtual image plane where the virtual image of the display object is displayed, the virtual image plane position being a display position of the virtual image for displaying the virtual image of the display object displayed on the display surface of the display element along the front road surface;
calculate a display position of the display surface of the display element corresponding to the virtual image plane position so as to output, to the image display device, a control signal for displaying the display object on the display position of the display surface of the display element; and calculate a height from the ground surface for displaying the virtual image on the virtual image plane as the virtual image plane position.

2. The head-up display according to claim 1, wherein the main controller is further configured to acquire the road surface information of the slope of the front road surface based on three-dimensional coordinates of each of the detected plurality of measurement points, and the three-dimensional coordinates are defined by a three-axis rectangular coordinate system in a real space.

3. The head-up display according to claim 1, wherein the main controller is further configured to calculate the display position of the display surface corresponding to the virtual image plane position based on the virtual image plane position of the virtual image in the real space by referring to virtual image plane-and-display surface linkage data in which coordinates on the virtual image plane and coordinates on the display surface are linked with each other.

4. The head-up display according to claim 1, wherein the main controller is further configured to calculate, as the virtual image plane position of the virtual image, a position of a point at which a line of sight connecting a viewpoint of a driver who visually recognizes that the virtual image with the front road surface intersects the virtual image plane.

5. The head-up display according to claim 2, wherein the three-axis rectangular coordinate system includes an x-z axis rectangular coordinate system included in a ground surface on which a traveling body mounted on the vehicle contacts and a y-axis perpendicular to the x-z axis rectangular coordinate system.

6. The head-up display according to claim 5, wherein the main controller is further configured to acquire an: for a plane including the plurality of measurement points as the road surface information, and calculate the virtual image plane position based on the estimation formula.

7. The head-up display according to claim 5, wherein the main controller is further configured to:

further acquire or calculate, as the road surface information, a road surface angle which is an angle formed by a plane including the plurality of measurement points with respect to the ground surface; and set a shape of the display object at a time of being displayed on the ground surface as a basic shape so as to display the display object after rotation, which is obtained by rotating the basic shape based on the road surface angle, at the display position for the display object on the image display device.

8. The head-up display according to claim 5, wherein the main controller is further configured to:

acquire, as the road surface information, a road surface angle which is an angle formed by a plane including the plurality of measurement points with respect to the ground surface;

calculate the virtual image plane position of the virtual image by using the road surface angle; and set a shape of the display object at a time of being displayed on the ground surface as a basic shape so as to display the display object after rotation, which is obtained by rotating the basic shape based on the road surface angle, at the display position for the display object on the image display device.

9. A head-up display for irradiating an image light including a display object toward a projection target member so as to display the display object as a virtual image, the head-up display comprising:

an image display device including a light source and a display element, the image display device being configured to output the image light generated by a light which has been emitted from the light source and transmitted through the display object displayed on a display surface of the display element; and a main controller connected to the image display device, wherein the main controller is configured to:

acquire road surface information of a front road surface based on a plurality of measurement points on the front road surface, the plurality of measurement points being detected by a road surface detection sensor mounted on a vehicle with the head-up display and being positioned forward of a traveling direction of the vehicle;

calculate, by using the road surface information, a virtual image plane position on a virtual image plane where the virtual image of the display object is displayed, the virtual image plane position being a display position of the virtual image for displaying the virtual image along the front road surface;

calculate a display position of the display surface corresponding to the virtual image plane position so as to output, to the image display device, a control signal for displaying the display object on the display position of the display surface;

acquire positional information of a virtual image display target object in a captured image of the front road surface which has been captured by a camera mounted on the vehicle;

refer to camera-and-real space linkage data in which coordinates of a three-axis rectangular coordinate system in a real space and two-dimensional coordinates of a camera coordinate system are linked with each other so as to convert the positional information of the virtual image display target object into the coordinates of the three-axis rectangular coordinate system;

refer to the positional information of the virtual image display target object after conversion and the road surface information so as to calculate a plane including the plurality of measurement points near the virtual image display target object, and calculate the virtual image plane position for displaying a virtual image of a display object to be added to the virtual image display target object along the plane;

refer to virtual image plane-and-display surface linkage data, in which coordinates on the virtual image plane and coordinates on the display surface are linked with each other, so as to convert the virtual image plane position of the display object to be added to the virtual image display target object into the display position of the display surface; and output, to the image display device, a control signal for displaying the display object to be added to the virtual image display target object on the display position of the display surface.

10. The head-up display according to claim 1, wherein the image display device is a liquid crystal display including:
- the light source;
- the display element; and
- an illumination optical system disposed between the light source and the display element, which is configured to guide a light emitted from the light source to the display element.

11. The head-up display according to claim 1, wherein the image display device is a microelectromechanical system including:
- a laser light source;
- a scanning mirror that reflects a laser light emitted from the laser light source;
- a scanning mirror drive unit configured to change an orientation of a mirror surface of the scanning mirror;
- a diffusion plate that forms an image by the laser light reflected by the scanning mirror; and
- a relay optical system on which an image light including image information of the display object, which has been formed on the diffusion plate, is made incident.

12. The head-up display according to claim 9, wherein the image display device is a liquid crystal display including:
- the light source;
- the display element; and
- an illumination optical system disposed between the light source and the display element, which is configured to guide a light emitted from the light source to the display element.

13. The head-up display according to claim 9, wherein the image display device is a microelectromechanical system including:
- a laser light source;
- a scanning mirror that reflects a laser light emitted from the laser light source;
- a scanning mirror drive unit configured to change an orientation of a mirror surface of the scanning mirror;
- a diffusion plate that forms an image by the laser light reflected by the scanning mirror; and
- a relay optical system on which an image light including image information of the display object, which has been formed on the diffusion plate, is made incident.

* * * * *